United States Patent
Reed et al.

(10) Patent No.: US 12,181,004 B2
(45) Date of Patent: Dec. 31, 2024

(54) FLEXIBLE COUPLING FOR A DRIVE TRAIN

(71) Applicant: JSI EQUIPMENT SOLUTIONS LLC, Boulder, CO (US)

(72) Inventors: Max Reed, Longmont, CO (US); Brian Wildes, Boulder, CO (US)

(73) Assignee: JSI EQUIPMENT SOLUTIONS LLC, Boulder, CO (US)

( * ) Notice: Subject to any disclaimer, the term of this patent is extended or adjusted under 35 U.S.C. 154(b) by 562 days.

(21) Appl. No.: 17/546,867

(22) Filed: Dec. 9, 2021

(65) Prior Publication Data

US 2022/0403893 A1 Dec. 22, 2022

Related U.S. Application Data

(60) Provisional application No. 63/213,542, filed on Jun. 22, 2021.

(51) Int. Cl.
*F16D 3/40* (2006.01)

(52) U.S. Cl.
CPC ........ *F16D 3/40* (2013.01); *F16D 2250/0084* (2013.01)

(58) Field of Classification Search
CPC ... F16D 3/38; F16D 3/387; F16D 3/40; F16D 3/70; F16D 3/72; F16D 2250/0084; F24S 2030/11; F24S 2030/12; F24S 2030/13; H02S 20/30; H02S 20/32; Y10T 403/32008; Y10T 403/32041; Y10T 403/32049
USPC ....... 464/134, 150, 153, 154; 403/53, 57, 58
See application file for complete search history.

(56) References Cited

U.S. PATENT DOCUMENTS

| 733,181 | A | * | 7/1903 | Forsyth | ............ F16D 3/38 464/119 |
| 826,756 | A | * | 7/1906 | Waldron | ............ F16D 3/40 464/119 |
| 2,046,584 | A | | 7/1936 | Rzeppa | |

(Continued)

FOREIGN PATENT DOCUMENTS

EP    0809927 B1    2/2001

OTHER PUBLICATIONS

Espacenet English Abstract of EP0809927B1 published Feb. 14, 2001, 1 page.

Primary Examiner — Josh Skroupa
(74) Attorney, Agent, or Firm — Bracewell LLP; Keith R. Derrington

(57) ABSTRACT

A flexible coupling for a drive train, the coupling having a drive yoke, a driven yoke, and a connector for transferring rotational torque between the yokes. The drive and driven yokes are manually inserted into slots in the connector. The drive yoke connects to a drive shaft and the driven yoke connects to a driven shaft. Rotating the drive shaft rotates the drive yoke against the connector causing it to rotate; which in turn transfers torque to and rotates the driven yoke. Surfaces on the yokes and connector that contact one another during rotation define contact surfaces. Portions of the yokes and/or connector having the contact surfaces are obliquely profiled so that contact surfaces on the yokes are complementary to corresponding contact surfaces on the connector, which increases the areas of force transfer between the yokes and connectors.

20 Claims, 12 Drawing Sheets

(56) References Cited

U.S. PATENT DOCUMENTS

| | | | |
|---|---|---|---|
| 3,580,010 A * | 5/1971 | Fisher | F16D 3/38 |
| | | | 464/150 |
| 3,663,044 A | 5/1972 | Contreras et al. | |
| 4,065,941 A | 1/1978 | Aoki | |
| 4,192,154 A | 3/1980 | Nakamura et al. | |
| 4,379,706 A | 4/1983 | Otsuka et al. | |
| 4,643,699 A * | 2/1987 | Taig | F16D 3/38 |
| | | | 464/112 |
| 5,628,688 A | 5/1997 | Eversole et al. | |
| 6,179,716 B1 * | 1/2001 | Asa | F16D 3/04 |
| | | | 464/153 |
| 6,464,589 B1 * | 10/2002 | Shinozuka | F16D 3/005 |
| | | | 464/153 |
| 7,442,126 B2 | 10/2008 | Thompson | |
| 9,206,999 B2 | 12/2015 | Reed et al. | |
| 9,276,521 B2 | 3/2016 | Reed et al. | |
| 9,469,332 B2 | 10/2016 | Yoshida et al. | |
| 2003/0004001 A1 | 1/2003 | Bell et al. | |
| 2004/0192447 A1 | 9/2004 | Fisher et al. | |
| 2008/0051204 A1 | 2/2008 | Hahn et al. | |
| 2012/0034983 A1 | 2/2012 | Patrascu et al. | |
| 2014/0370995 A1 | 12/2014 | Collins et al. | |
| 2015/0005081 A1 | 1/2015 | Harnetiaux | |
| 2015/0059827 A1 | 3/2015 | Reed et al. | |
| 2015/0075897 A1 | 3/2015 | Copeland | |
| 2017/0328414 A1 | 11/2017 | Sadabadi | |
| 2018/0175784 A1 * | 6/2018 | Lange | H02S 20/32 |

\* cited by examiner

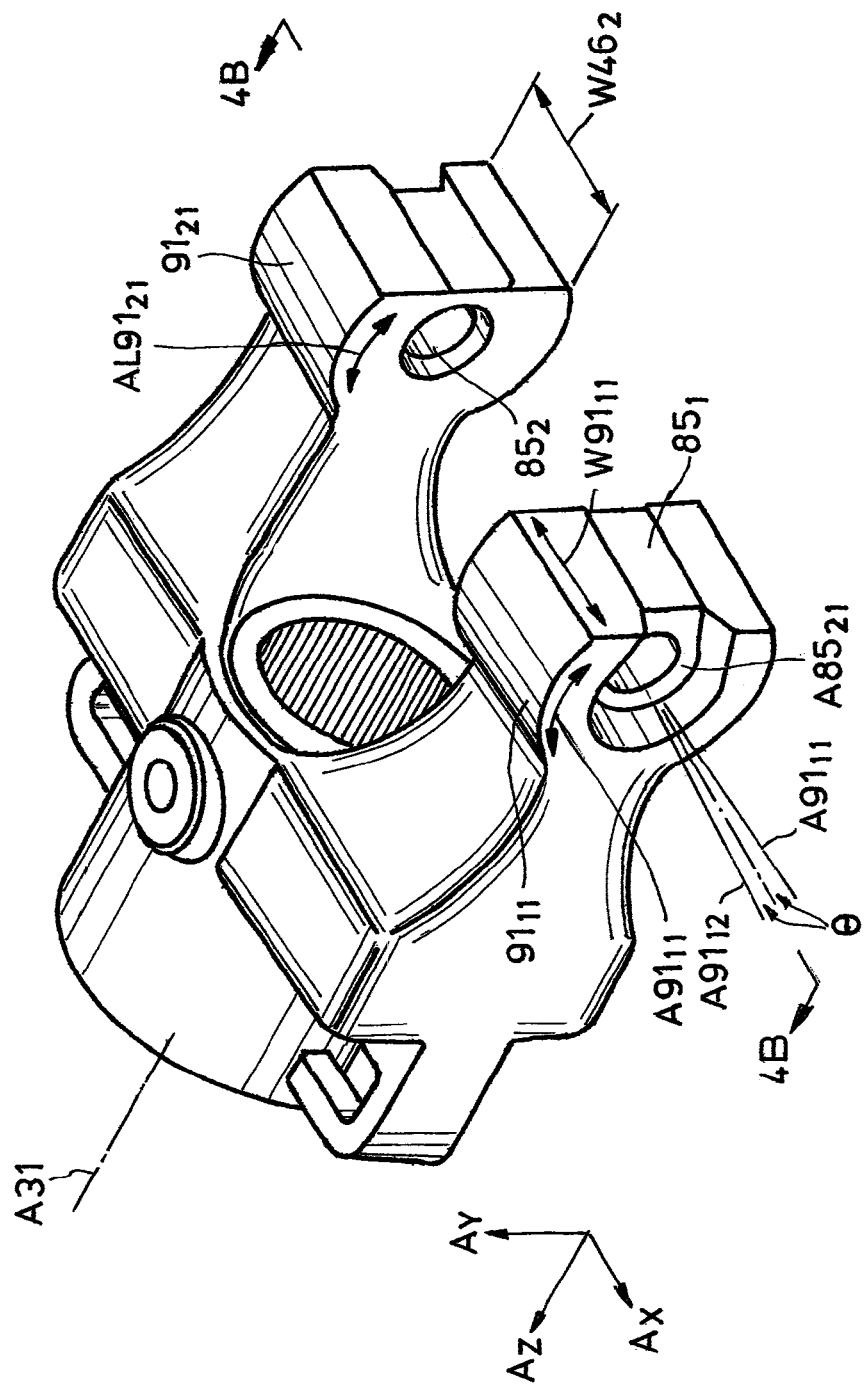

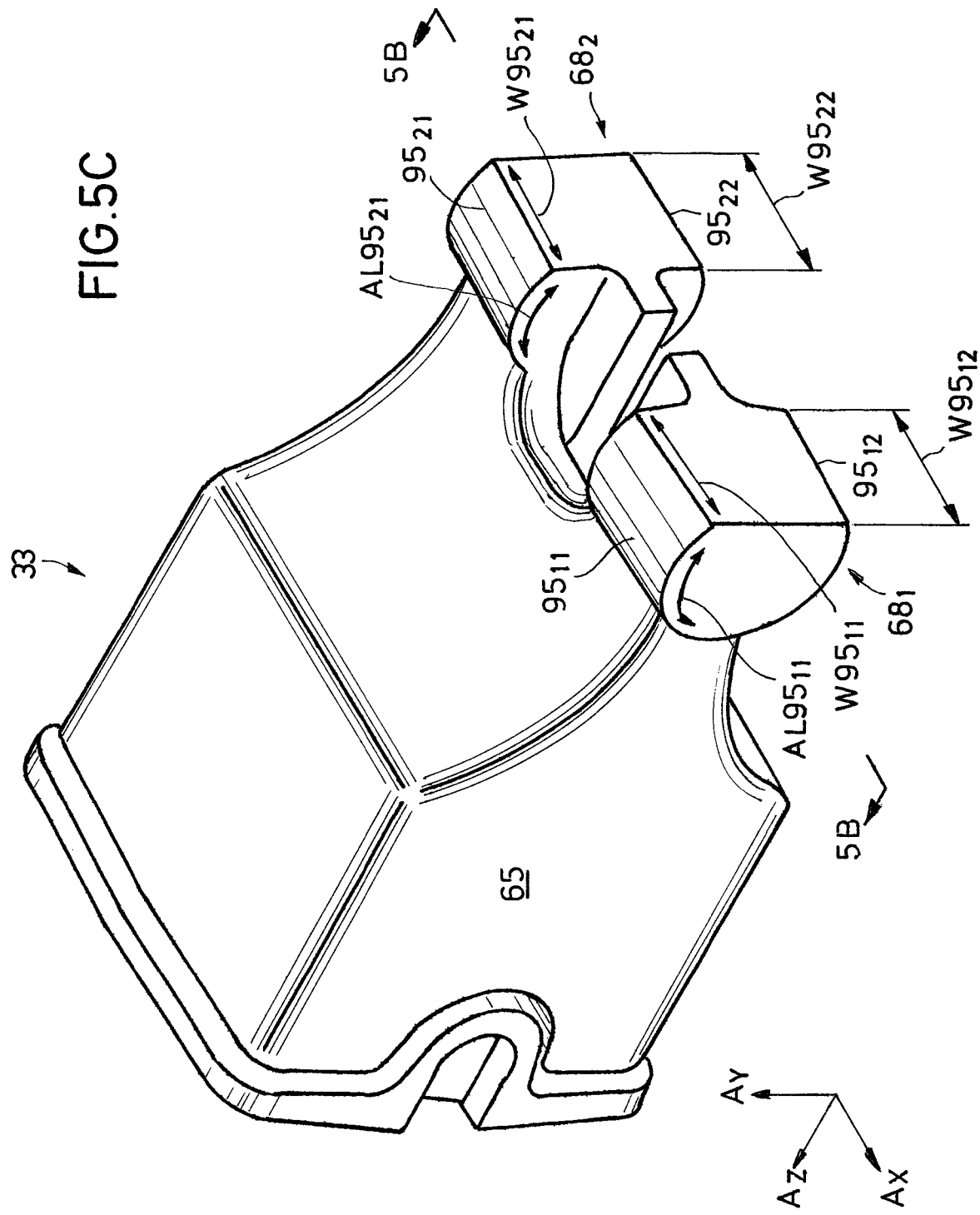

FLEXIBLE COUPLING FOR A DRIVE TRAIN

CROSS-REFERENCE TO RELATED APPLICATION

This application claims priority from U.S. Provisional Application Ser. No. 63/213,542, filed Jun. 22, 2021, the full disclosure of which is incorporated by reference herein in its entirety and for all purposes.

BACKGROUND

1. Field

The present disclosure relates to a flexible coupling for use in a drive train.

2. Description

In power transmission, rotating shafts are often joined in some manner to transmit torsion. A rigid coupling is sometimes used when the shafts are perfectly coaxial. When the coupled shafts are not coaxial a flexible coupling is typically installed instead of a rigid coupling; as flexible couplings can transmit torsion between two misaligned shafts.

Some flexible couplings have an elastomer insert to flex and give the coupling compliance. Elastomers though have a limited torque capacity and can fail when subjected to high loading. They are also sensitive to ultraviolet light and temperature and usually require scheduled replacement. Other types of flexible couplings incorporate thin plate members to flex. While these can transmit larger torque than with elastomeric couplings, they can fatigue and fail over time and their operating angles of misalignment are smaller than for elastomeric couplings. Other types allow the entire coupling to flex by creating a bellows or flexible center portion of the coupling; but bellows type couplings are limited in the amount of torque they can transmit.

For larger misalignments, a universal joint is generally employed. Usually universal joints include two yokes that pivot independently on a cross component (or spider), and with the two pivot axes being 90° apart. The pivot and rotation axes intersect at a common point at the center of the joint. Because the axes intersect, the joint has two degrees of freedom, allowing angular change in two orthogonal directions without any translation; which creates a generally smooth motion and allows for large misalignments between the two rotation axes. The cross typically includes needle roller bearings operate in grease filled cups on each leg of the cross. In applications when needle roller bearings do not undergo a complete rotation the load does not pass through all of the needle roller bearings, but instead is concentrated on only a few of them.

SUMMARY OF THE INVENTION

Disclosed is an example method of operating a drive train that includes obtaining a connector made up of a main body having a first slot, a second slot, and a socket formed in the first slot, obtaining a first yoke having a first yoke arm with a pivot, obtaining a second yoke having a second yoke arm, inserting the first yoke arm into the first slot so that the pivot is within the socket, inserting the second yoke arm into the second slot, and rotating the second yoke by rotating the first yoke. A pivot is optionally formed on an end of the second yoke arm that inserts into a socket formed in the second slot, the pivot having a male convex profile and the socket having a female concave profile. In an example, at least a portion of a contact surface on the first yoke arm is oblique with a corresponding first contact surface on the connector when the first yoke arm is inserted in the first slot and in a first position that is out of contact with the first slot sidewalls, and where the portion of the contact surfaces on the first yoke arm is substantially in complementary contact with the connector first contact surface when the first yoke is in a second position. In this example a second yoke contact surface is defined on a portion of the second yoke arm and a connector second contact surface is defined on a portion of the connector, where the second yoke contact surface is oblique to the connector second contact surface when the second yoke arm is inserted into the second slot and out of contact with the second slot sidewalls, and the second yoke contact surface is substantially in complementary contact with the connector second contact surface when the first yoke is rotated from the second position to a third position. In an example of operation, rotating the second yoke adjusts a solar panel that is coupled with the second yoke. In an embodiment, the first yoke includes another first yoke arm that is inserted into the first slot. In an alternative, sidewalls on opposing sides of the second slot that are profiled to define a socket within the second slot, the socket having an axis that extends in a direction perpendicular to a side of the connector, and where a pivot on a free end of the second yoke arm inserts into the socket and is pivotable about the socket axis. The first yoke arm is optionally configured to be manually inserted into the first slot of the connector and the second yoke arm is optionally configured to be manually inserted into second slot of the connector, the method further including using a pin to retain one of the first or second yokes to the connector.

Also disclosed is an example of a coupling assembly for use with a drive train and that includes a connector made up of a main body, a first slot formed in the main body and having a portion that defines a socket, a connector first contact surface in the first slot, a second slot on a side of the connector main body facing away from the first slot, and a connector second contact surface on the second slot sidewalls. This example of the coupling assembly also includes a first yoke having a first yoke arm configured to be manually insertable into the first slot and a pivot on an end of the first yoke arm that is in interfering contact with the socket when the first yoke arm is inserted into the first slot, a second yoke having a second yoke arm configured to be manually insertable into the second slot, so that when the first yoke is rotated, torque is transferred through the connector to rotate the second yoke. In alternatives, the first yoke is rotatable from a first position that is out of contact with the connector to a second position that is in contact with the connector, in this example the first yoke includes an end selectively coupled with a drive shaft, a first yoke contact surface having a portion that is oriented oblique with the connector first contact surface when the first yoke is in the first position and the portion of the first yoke contact surface being in complementary contact with the connector first contact surface when the first yoke is in the second position. The length of the first yoke contact surface optionally follows a generally circular path. Embodiments exist in which the first yoke is further rotatable to a third position that rotates the connector in the same angular direction as the first yoke. In an example, rotating the first yoke from about 0.5° to about 3° in a first direction moves the first yoke from the first to the second position, and wherein further rotating the first yoke from about 0.5° to about 3° in the first direction moves the first yoke from the second to the third position. In one embodiment the second yoke arm includes a second yoke contact surface having a portion that is oblique to a connector second contact surface on the driven slot sidewalls when the second yoke arm is inserted into the second slot and out of contact with the second slot sidewalls and when the first yoke is in the first position, and where when the first yoke is rotated into the third position the portion of the second yoke contact surface is in complementary contact with the connector second contact surface. Examples exist in which a width of the first yoke contact surface spans along and is oblique to a horizontal axis of the first yoke, and where a length of the first yoke contact surface is curved and spans along a lengthwise axis of the first yoke. In examples the coupling assembly includes another first yoke arm, another second yoke arm, another connector first contact surface, and another connector second contact surface, where contact surfaces are on the first yoke arm and the another first yoke arm that face away from one another, and wherein contact surfaces are on the second yoke arm and the another second yoke arm that face away from one another. In this example, when the first yoke is rotated to a second position portions of the first yoke arm and the another yoke arm are in complementary contact with portions of connector first contact surfaces, and where when the first yoke is rotated to a third position, connector second contact surfaces have portions that are in complementary contact with contact surfaces on the second yoke arm and the another second yoke arm. In one alternative, the first and second slots extend generally transverse to one another through a main body of the connector, and wherein a fastener couples the first and second yokes.

Another example of a coupling assembly for use with a drive train is disclosed that includes a first yoke, a second yoke, a connector having a portion coupled to the first yoke and another portion coupled to the second yoke, and a pin selectively inserted into coupling engagement with the first yoke and with the second yoke. The connector optionally defines a means for transferring rotation between the first yoke and second yoke.

BRIEF DESCRIPTION OF DRAWINGS

Some of the features and benefits of the present invention having been stated, others will become apparent as the description proceeds when taken in conjunction with the accompanying drawings, in which:

FIGS. 4A-4C are side, front, and perspective views of an example of a drive yoke for use with the coupling assembly of FIG. 2.

FIGS. 5A-5C are side, front, and perspective views of an example of a driven yoke for use with the coupling assembly of FIG. 2.

Figure 1A:
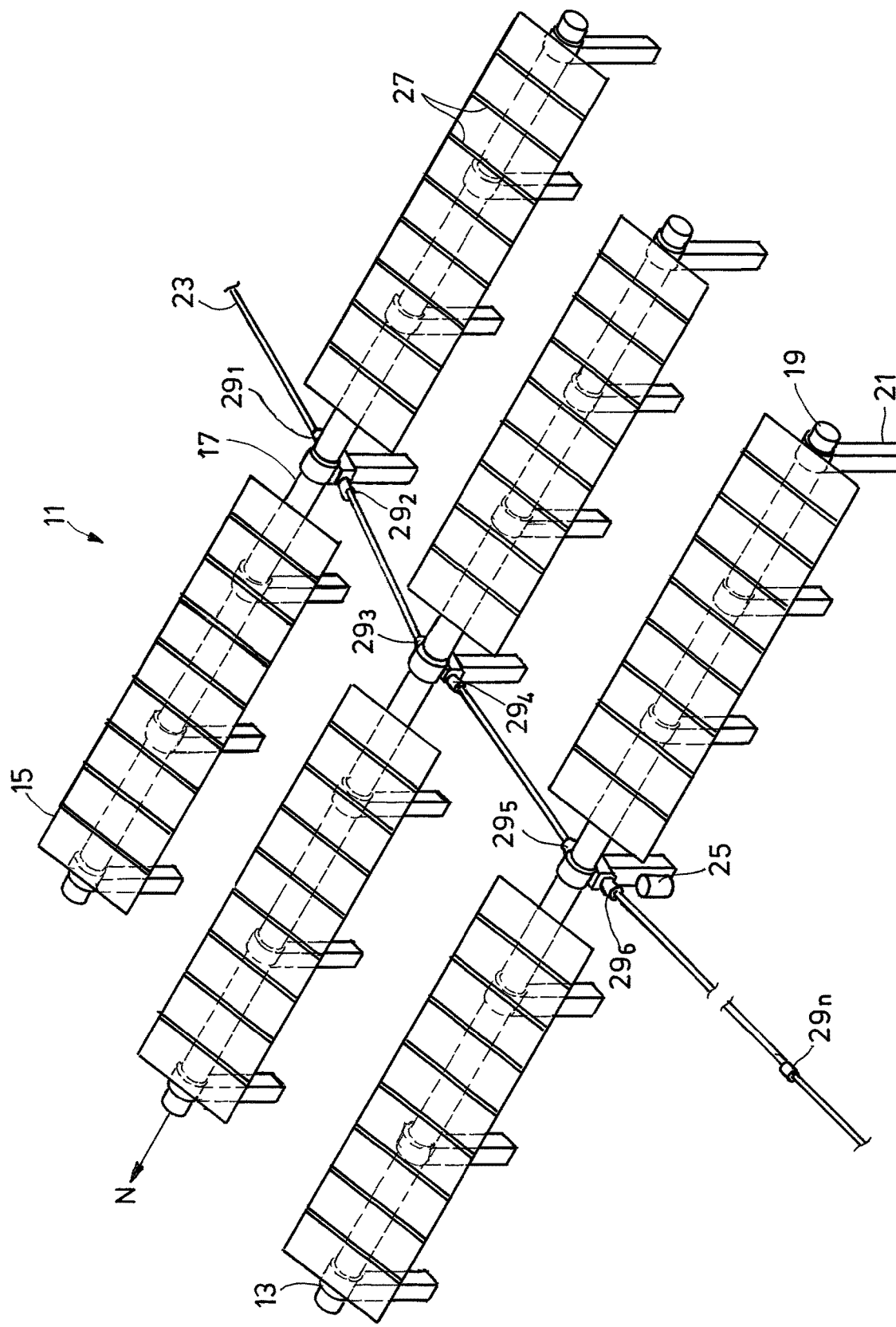
FIGS. 1A and 1B respectively are overhead and side sectional perspective views of an example of a solar array system.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1B:
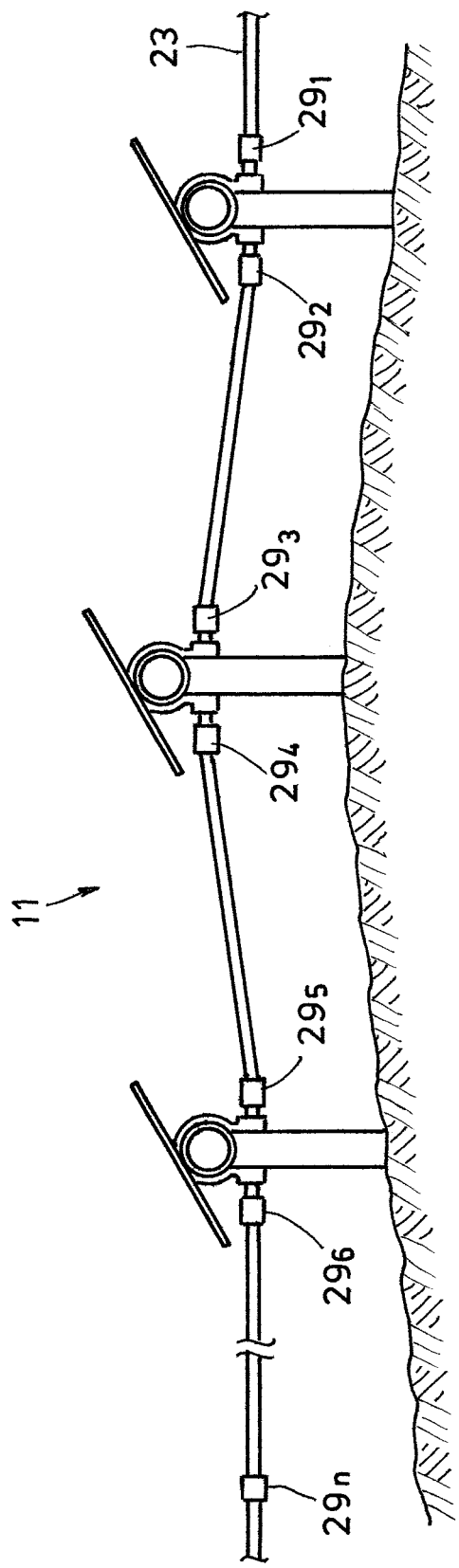

An example of a solar array system 11 is shown in perspective view in FIG. 1A and in a side view in FIG. 1B. Solar array system 11 of FIGS. 1A/B is configured to track movement of the sun during the day, and as illustrated is equipped with several parallel rows 13 (three shown) aligned in a north-south direction. Included in the rows 13 are solar panels 15 (alternatively referred to as photovoltaic panels), each are shown mounted on a torque or support tube 17. In embodiments, a single tube 17 is in each row 13 and that extends a full length of the row 13. As described in more detail below, the solar panels 15 are selectively tilted to track the path of the sun during the day by rotating support tubes 17.

Further in the example of FIGS. 1A/B are mounting assemblies 19 for coupling the support tubes 17 to vertical posts 21, and also include bearings to facilitate rotation of the support tubes 17. Posts 21 are embedded in the earth or a provided foundation at selected distances apart from each other. For a tracking system, a drive shaft 23 extends perpendicular to rows 13 and engages each support tube 17 to cause pivotal rotation of each support tube 17. In an example drive shaft 23 rotates, and in alternatives drive shaft 23 moves linearly. Drive shaft 23 as illustrated engages support tubes 17 midway along the lengths of each row 13, and alternate engagement locations exist. In a non-limiting example, support tubes 17 range up to around 200 feet in length or more, and posts 21 are around 18 feet apart from each other.

Shown in FIG. 1A are clamps 27 for securing each solar panel 15 to one of the support tubes 17. In examples, clamps 27 are employed with support tubes 17 that automatically rotate, support tubes 17 that are manually rotated from one climate season to another, and also with fixed, non-rotating support tubes. Coupling assemblies $29_{1-n}$ are shown mounted at each end of the drive shaft 23. In examples and as discussed in more detail below, the coupling assemblies $29_{1-n}$ couple together and transfer torque between adjacent sections of the drive shaft 23. The coupling assemblies $29_{1-n}$ are flexible and in embodiments when adjacent sections of the drive shaft 23 are not coaxial but oblique to one another, opposing ends of the coupling assemblies $29_{1-n}$ pivot with respect to one another while attached to ends of the drive shaft 23 and/or support tubes 17 that are oblique to one another.

Figure 2:
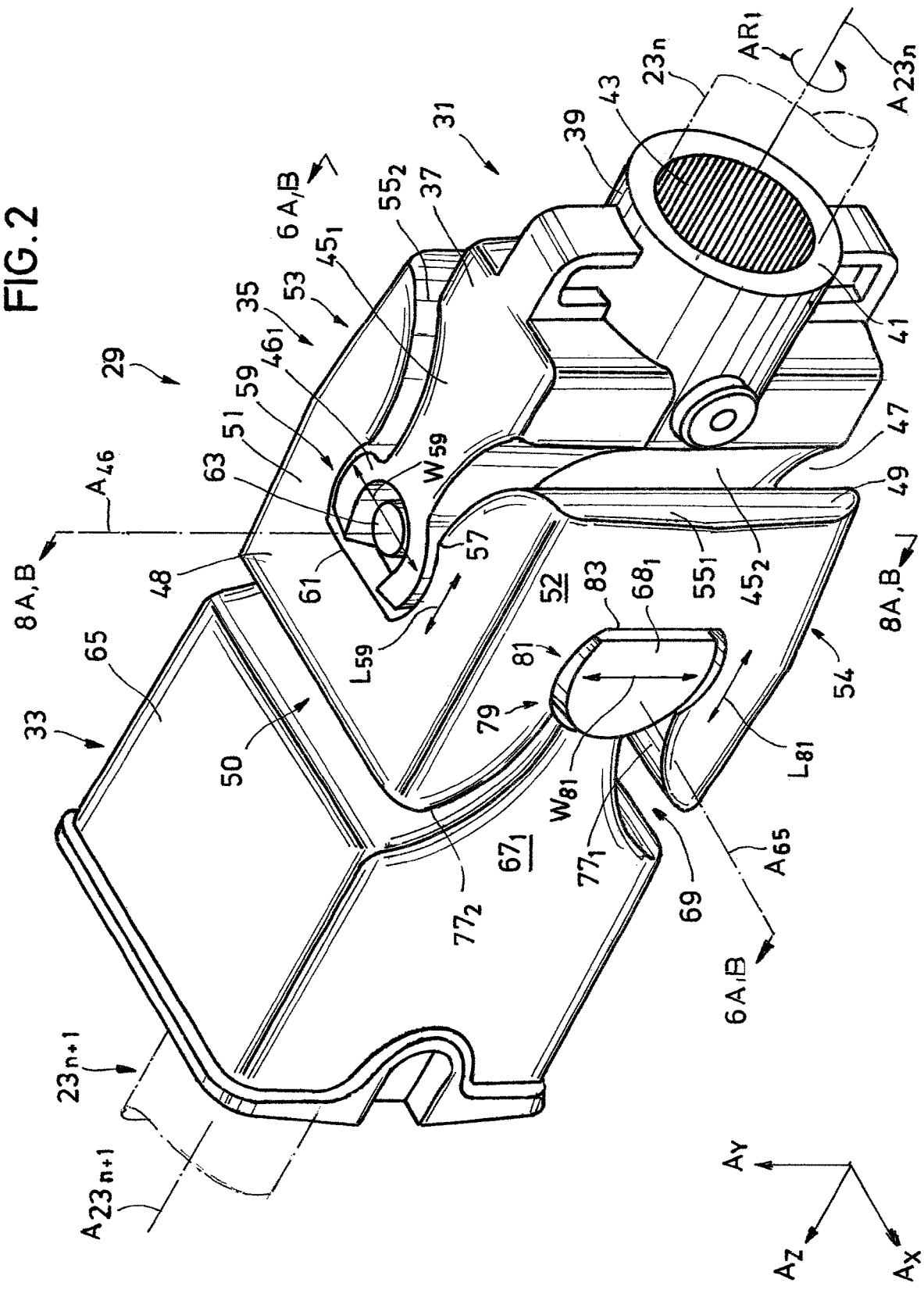
FIG. 2 is a perspective view of an example of a coupling assembly for use with the solar array system of FIG. 1.

Referring now to FIG. 2, shown in a perspective view is an example of the coupling assembly 29 of FIG. 1; and which includes a first yoke 31 coupled to a second yoke 33 via a connector 35. As shown, the first yoke 31 includes a main body 37 which has a largely rectangular outer profile. In the example shown main body 37 has a height exceeding its width and thickness. For the purposes of illustration a coordinate axis is shown with a horizontal or lateral axis represented as $A_X$. A forward or lengthwise axis is represented as $A_Z$, and a vertical or height-wise axis is represented by $A_Y$. Based on these coordinate axes the horizontal width of the main body 37 extends along axis $A_X$, the length of the main body 37 extends along axis $A_Z$, and the height of the main body 37 extends along axis $A_Y$. It is pointed out though that in non-limiting examples of operation drive train 23, coupling assembly 29, and its components experience translational and rotational motion. Spatial references provided herein to any of axes $A_X$, $A_Y$, $A_Z$ are taken at an instant in time, or when the drive train 23 and/or coupling 29 are static, and are to provide relative locations and/or orientations of the various components described herein; and as such these spatial references may or may not accurately reflect positioning of a described component at a later point in time.

In FIG. 2 first yoke collar 39 is shown projecting from a rearward side of the main body 37 which includes a circular receptacle 41 formed within an extending along axis $A_Z$. Splines 43 are formed along an inner surface of receptacle 41 shown oriented generally parallel with axis $A_z$. In the example shown splines 43 engage splines (not shown) formed on an outer surface of an example of drive shaft $23_n$ when a drive end of drive shaft $23_n$ inserts into receptacle 41. Arms $45_{1,2}$ are shown each having a rearward end mounted on a forward side of main body 37 that is opposite from first yoke collar 39. As shown, arms $45_{1,2}$ have generally planar upper and lower surfaces, and curved lateral surfaces that converge towards one another with distance away from first yoke main body 37. Arms $45_{1,2}$ are spaced axially apart from one another along axis $A_Y$, and each project in a direction away from first yoke collar 39. Ends of arms $45_{1,2}$ opposite from main body 37 are each fitted with a pivots $46_{1,2}$. In the embodiment of FIG. 2, each of the pivots $46_{1,2}$ has upper and lower surfaces that are generally planar and lateral surfaces that are curved. Rearward surfaces of each pivot $46_{1,2}$ attach to a respective one of the arms $45_{1,2}$. Forward facing surfaces of pivots $46_{1,2}$ on a side opposite from where they attach to arms $45_{1,2}$ are generally planar. The arms $45_{1,2}$ with attached pivots $46_{1,2}$ are shown inserted within a first slot 47 that is formed through a rearward facing side of the connector main body 48. A rearward surface 49 of connector 35 is shown opposite second yoke 33, a forward surface 50 of connector 35 is shown on a side opposite first yoke 31. An upper surface 51 is defined on the side of connector 35 having the highest elevation along axis $A_Y$. First and second lateral surfaces 52, 53 extend between the rearward and forward surfaces 49, 50, and a lower surface 54 is on a side of connector main body 48 opposite from upper surface 51.

First slot 47 of FIG. 2 has opposing sidewalls $55_{1,2}$, proximate the rearward surface 49 sidewalls $55_{1,2}$ are at a distance apart from one another along axis $A_X$ which at a maximum distance is almost equal to a width of the connector 35. The sidewalls $55_{1,2}$ converge towards one another forward of the rearward surface 49 and along axis $A_Z$. Sidewalls $55_{1,2}$ extend substantially straight along axis $A_Y$. At a distance from forward surface 49 sidewalls $55_{1,2}$ are no longer converging, and instead begin to diverge from one another and define a local minimum distance between sidewalls $55_{1,2}$; a neck 57 is formed at the local minimum distance between sidewalls $55_{1,2}$. Forward of neck 57 along axis $A_Z$, the sidewalls $55_{1,2}$ follow oppositely facing concave like paths and terminate at an end wall 61 shown facing rearward that extends substantially parallel with axis $A_X$ at a base of the first slot 47. A socket portion 59 is defined inside slot 47 by the concave like path of sidewalls $55_{1,2}$ between neck 57 and end wall 61, in the example shown socket portion 59 has a length $L_{59}$ along axis $A_Z$ and a width $W_{59}$ along axis $A_X$. As shown, dimensions of width $W_{59}$ vary along axis $A_Z$ between neck 57 and end wall 61. The length $L_{59}$ and width $W_{59}$ of socket portion 59 exceeds that of pivots $46_{1,2}$ by an amount so that pivots $46_{1,2}$ are selectively rotatable with respect to connector 35 and about axis $A_{46}$ of pivots $46_{1,2}$ so that pivots $46_{1,2}$ are rotatable about axis $A_{46}$ of pivots $46_{1,2}$ and away from interfering contact with sidewalls $55_{1,2}$ when the arms $45_{1,2}$ and pivots $46_{1,2}$ are inserted into slot 47. As shown axis $A_{46}$ is parallel to axis $A_Y$. Further in this example, widths between opposing sidewalls $55_{1,2}$ exceed widths of arm $45_{1,2}$ along axis $A_Z$ to form a space in which arms $45_{1,2}$ are pivotable within and without interfering contact from sidewalls $55_{1,2}$. In a non-limiting example of operation pivots $46_{1,2}$ and attached arms $45_{1,2}$ pivot about axis $A_{46}$, and have an angular range of pivoting motion about axis $A_{46}$ that is constrained by the width of the space between arms $45_{1,2}$ and sidewalls $55_{1,2}$. In the example of FIG. 2, arms $45_{1,2}$ are affixed to main body 37 and first yoke collar 39, so that when drive shaft $23_n$ is engaged with first yoke collar 39 as shown, pivoting of drive shaft $23_n$ about axis $A_{46}$ in turn causes all of first yoke 31 to pivot about axis $A_{46}$ and with respect to connector 35. Due to their curved outer periphery pivots $46_{1,2}$ have widths whose dimensions vary along axis $A_Z$ and that exceed dimensions of width $W_{59}$ proximate neck 57; this difference in widths interferes with movement of pivots $46_{1,2}$ in a rearward direction past neck 57. In embodiments where the components of the first yoke 31 (including the pivots $46_{1,2}$, arms $45_{1,2}$, and main body 37) are rigidly affixed to one another, each component has the same angular range of pivotable motion about axis $A_{46}$. A pin 63 is shown inserted laterally through pivot $46_1$, described in more detail below is that pin 63 provides a coupling means for retaining the first yoke 31 and second yoke 33 to the connector 35.

Still referring to FIG. 2, second yoke 33 is shown also having a main body 65 that has a generally rectangular like outer periphery and with arms $67_{1,2}$ spaced apart from one another along axis $A_X$. Arms $67_{1,2}$ project away from second yoke main body 65 along axis $A_Z$ in a direction towards the first yoke 31. The arms $67_{1,2}$ as shown have generally planar lateral surfaces, and curved upper and lower surfaces that converge towards one another with distance away from second yoke main body 65. Pivots $68_{1,2}$ are depicted formed on ends of each arm $67_{1,2}$ distal from main body 65. Pivots $68_{1,2}$ have planar lateral surfaces and curved upper and lower surfaces. Pivots $68_{1,2}$ are also generally planar on their rearward facing side which is opposite from where they attach to arms $67_{1,2}$. The arms $67_{1,2}$ with attached pivot $68_{1,2}$ are shown inserted within a second slot 69 that is formed through the rearward side 50 of connecter 35 and along a direction substantially transverse to the first slot 47. Similar to the first slot 47, driven slot 67 includes opposing lateral sidewalls $77_{1,2}$ that converge towards one another with distance away from the forward surface 50 and towards the forward surface 49, a neck 79 is formed within the second slot 69 where the distance between the sidewalls $77_{1,2}$ is at a minimum. Sidewalls $77_{1,2}$ diverge away from one another past neck 79 and follow oppositely facing concave like paths to define a socket portion 81 in the slot 69. Rearward of the neck 79 sidewalls $77_{1,2}$ terminate at an end wall 83 shown extending along path generally parallel with axis $A_Y$ and a distance from the forward surface 50. In the example shown socket portion 81 has a length $L_{81}$ along axis $A_Z$ and a width $W_{81}$ along axis $A_Y$. As shown, dimensions of width $W_{81}$ vary along axis $A_Z$ between neck 79 and end wall 83. The length $L_{81}$ and width $W_{81}$ of socket portion 81 exceeds that of pivots $68_{1,2}$ by an amount so that pivots $68_{1,2}$ are rotatable about axis $A_{68}$ of pivots $68_{1,2}$ and away from interfering contact with sidewalls $77_{1,2}$ when the arms $67_{1,2}$ and pivots $68_{1,2}$ are inserted into slot 69. As shown axis $A_{68}$ is parallel to axis $A_X$. Further in this example, widths between opposing sidewalls $77_{1,2}$ exceed widths of arm $67_{1,2}$ along axis $A_Z$ to form a space in which arms $67_{1,2}$ are pivotable within and without interfering contact from sidewalls $77_{1,2}$. In a non-limiting example of operation pivots $68_{1,2}$ and attached arms $67_{1,2}$ pivot about axis $A_{68}$, and have an angular range of pivoting motion about axis $A_{68}$ that is constrained by the width of the space between arms $67_{1,2}$ and sidewalls $77_{1,2}$. In the example of FIG. 2, arms $67_{1,2}$ are affixed to main body 65, which is affixed to driven shaft $23_{n+1}$, so that when driven shaft $23_{n+1}$ is engaged with main body 65 as shown, pivoting of driven shaft $23_{n+1}$ about axis $A_{68}$ in turn causes all of second yoke 33 to pivot about axis $A_{68}$ and with respect to connector 35. In embodiments where the components of the second yoke 33 (including the pivots $68_{1,2}$, arms $67_{1,2}$, and main body 65) are rigidly affixed to one another, each component has the same angular range of pivotable motion about axis $A_{68}$. Due to their curved outer periphery pivots $68_{1,2}$ have widths whose dimensions vary along axis $A_Z$ and that exceed dimensions of width $W_{81}$ proximate neck 79; this difference in widths interferes with movement of pivots $68_{1,2}$ in a forward direction past neck 79. Socket portion 59 of the first slot 47 retains pivots $46_{1,2}$ and socket portion 81 of second slot 69 retains pivots $68_{1,2}$ and allows for pivoting of the second yoke 33. As the width of the neck 79 is less than the width of pivots $68_{1,2}$, the second yoke 33 is restrained from the movement along the axis $A_Z$ with respect to the connector 35. In examples, first yoke 31 and attached drive train $23n$ are pivotable with respect to connector 35 at angular values that range up to about +/−5°, up to about +/−10°, up to about +/−15°, and all values within these ranges.

Figure 3:
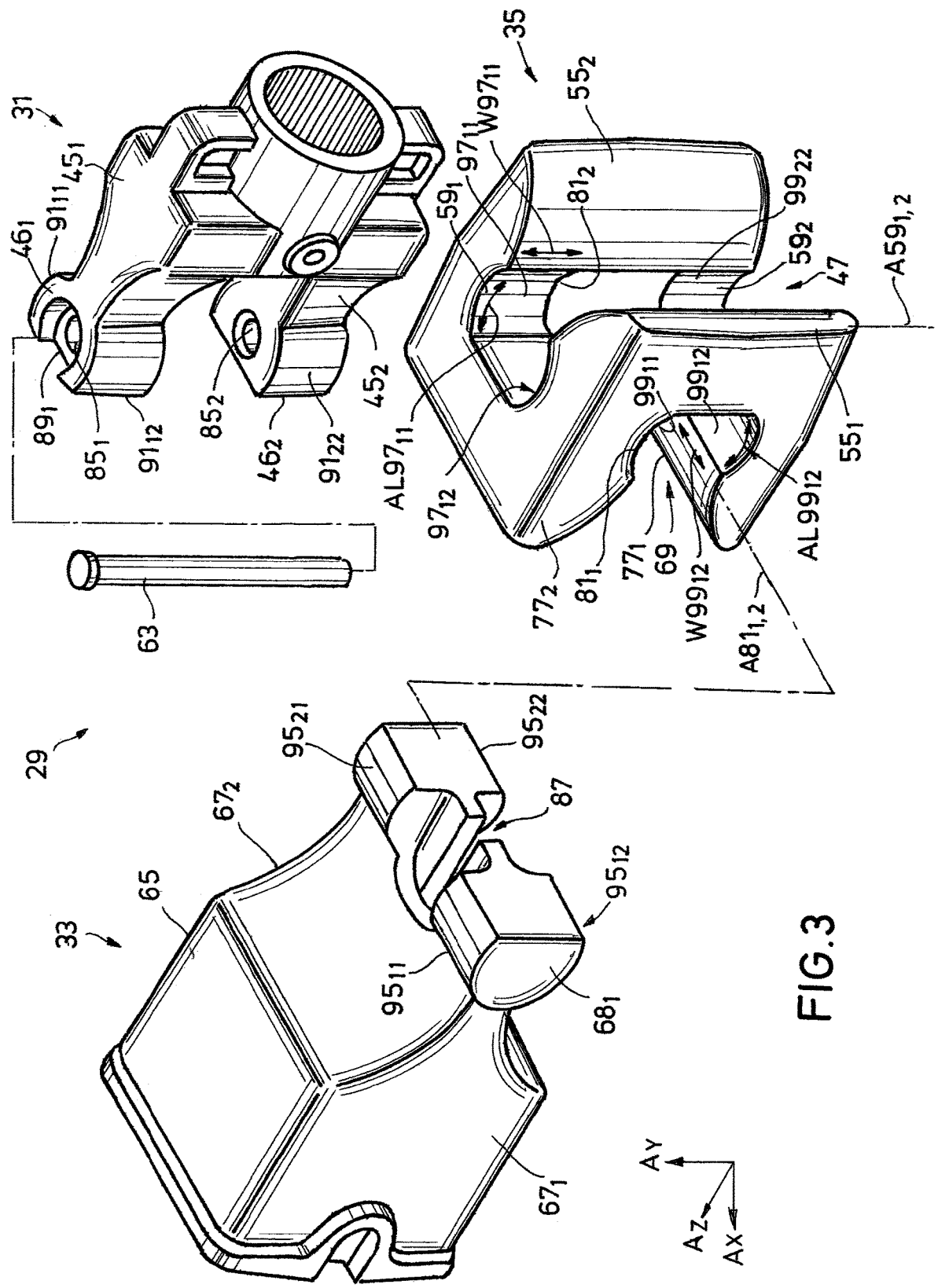
FIG. 3 is an exploded view of the coupling assembly of FIG. 2.

Referring now to FIG. 3, an example of the connector assembly 29 of FIG. 2 is shown in an exploded view. In this example, bores $85_{1,2}$ are shown projecting within each of the pivots $46_{1,2}$ and in a direction along axis $A_Y$. One of the advantages of the coupling assembly 29 is its simplicity, as it is made up of three primary components, i.e. first yoke 31, second yoke 33, and connector 35; and assembling the coupling assembly 29 is performed by manually inserting arms $45_{1,2}$, $67_{1,2}$ of the first and second yokes 31, 33 into slots 47, 69 of the connector 35 and so that arms $45_{1,2}$, $67_{1,2}$ are received by socket portions $59_{1,2}$, $81_{1,2}$. The complexity of known devices for pivoted coupling is reduced with the present disclosure by the male coupling elements on the arms $45_{1,2}$, $67_{1,2}$ (e.g. pivots $48_{1,2}$, $68_{1,2}$) having convex profiles, and the socket portions $59_{1,2}$, $81_{1,2}$ that define female coupling elements with concave profiles. Moreover, clearance exists between the arms $45_{1,2}$, $68_{1,2}$ and slots 47, 50 so that the arms $45_{1,2}$, $68_{1,2}$ insert into the slots 47, 50 freely or with nominal effort, allowing manual assembly of the first and second yokes 31, 33 and connector 35 without the need for tools or other forms of a mechanical advantage. The complementary profiling of the respective upper and lower surfaces of the pivots $48_{1,2}$, $68_{1,2}$ and socket portions $59_{1,2}$, $81_{1,2}$ enables pivoting of the first and second yokes 31, 33 with respect to the connector 35 and with one another. As explained in more detail below, when first yoke 31 pivots with respect to connector 35 the pivots $46_{1,2}$, rotate about axis $A59_{1,2}$ shown extending through socket portions $59_{1,2}$, and when second yoke 33 pivots with respect to connector 35 the pivots $68_{1,2}$, rotate about axis $A81_{1,2}$ shown extending through socket portions $81_{1,2}$. When assembled, and as shown in FIG. 2, pin 63 inserts through bores $85_{1,2}$ and through an elongate slot 87 shown having a length extending along axis $A_Z$ and which is formed between the pivots $68_{1,2}$ and arms $67_{1,2}$. Pin 63 is shown as an elongate member, and in alternatives is a bolt, a screw, or any now known or later developed fastener that provides coupling. As illustrated, when the second yoke 33 is inserted into and retained within the second slot 69, portions of arms $67_{1,2}$ project laterally inward and between arms $45_{1,2}$ and interfere with vertical movement of the first yoke 31 (i.e. along axis $A_Y$). This in combination with dimensioning of the pivots $46_{1,2}$ and socket portions $59_{1,2}$ that interferes with rearward movement of the first yoke 31, couples the first yoke 31 to the connector 35. Further in the example shown, placing pin 63 so that a portion extends into slot 87 puts pin 63 in a position that interferes with lateral movement of second yoke 33 (i.e. along axis $A_X$). This in combination with the dimensions of the pivots $68_{1,2}$ and socket portions $81_{1,2}$, that block forward movement of second yoke 33 (i.e. along axis $A_Z$), couple second yoke 33 with connector 35. In an alternative, retaining means (not shown) are included for securing pin 63 in place as shown in FIG. 2. Examples of retaining means include threads (not shown) on the shaft of pin 63 that engage threads in one or both of the bores $85_{1,2}$. Retaining means for the pin 63 could also optionally include a spring loaded ball and detent arrangement, or a nut that threads onto an end of the pin 63. Another advantage in the present disclosure is that pin 63 provides a means for coupling together first yoke 31, second yoke, 33, and connector 35, and which also interferes with decoupling of first and second yokes 31, 33 from connector 35. Another advantage is that pin 63 is installed manually and without the need for tools or other forms of mechanical advantage. Further shown in this example of FIG. 3 is a recess $89_{1,2}$ that is formed on opposing lateral sides of pivots $46_{1,2}$ and circumscribing bores $85_{1,2}$.

Figure 4A:
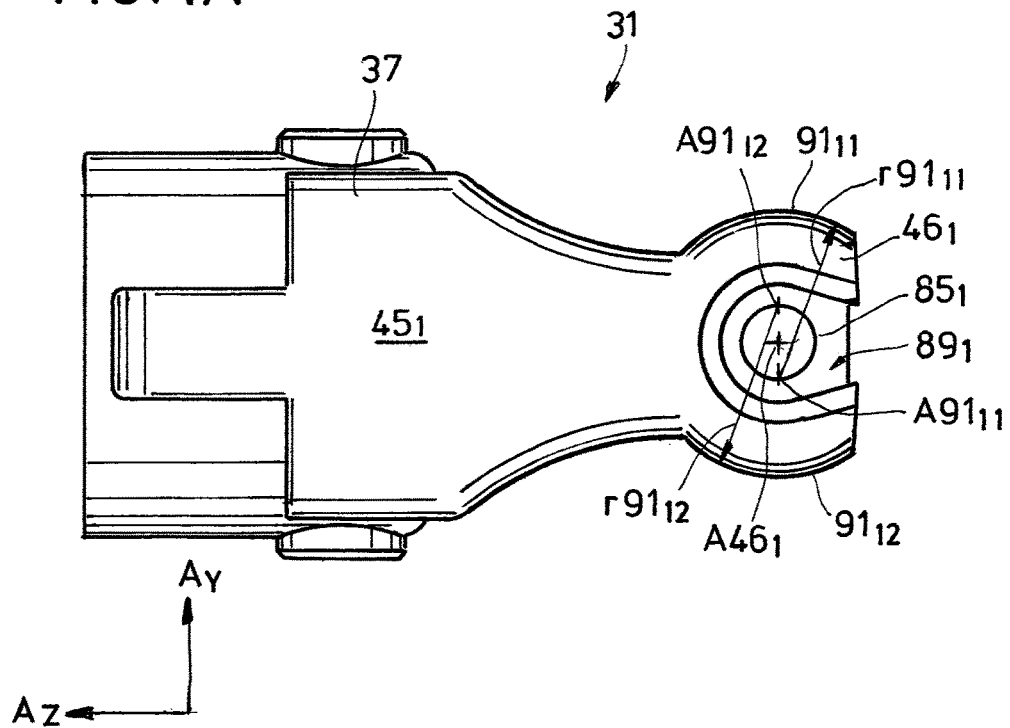
Figure 4B:
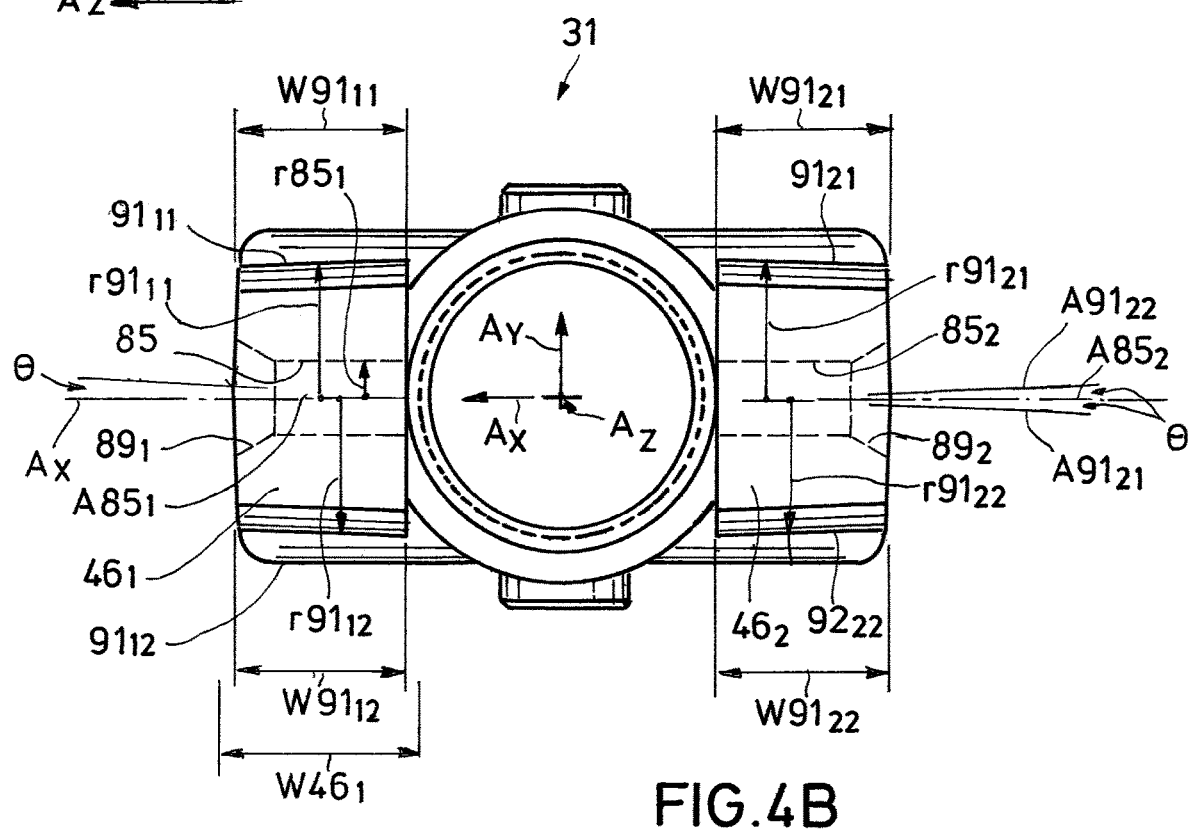

Illustrated in FIGS. 4A-4C are side, elevational, and perspective views of examples of the first yoke 31. First yoke contact surfaces $91_{11, 12, 21, 22}$, ("$91_{11-22}$") are shown formed on upper and lower outer surfaces of each of the pivots $46_{1,2}$. In the example shown, contact surfaces $91_{11\text{-}22}$ have widths $W91_{11,\,12,\,21,\,22}$, ("$W91_{11\text{-}22}$") whose magnitudes that are each substantially the same as magnitudes of widths $W46_{1,\,2}$ of the pivots $46_{1,2}$; in alternatives magnitudes of widths $W91_{11\text{-}22}$ are different from magnitudes of widths $W46_{1,2}$, and in a further alternative magnitudes of widths $W91_{11\text{-}22}$ are different from one another. As shown in the examples of FIGS. 4A and 4C, lengthwise and along axis $A_Z$ the contact surfaces $91_{11\text{-}22}$ follow a generally curved path. Provided in FIG. 4C are examples of arc lengths $AL91_{11,\,21}$ of contact surfaces $91_{11}$, $91_{21}$. Shown in the example of FIG. 4A contact surface $91_{11}$ has radius $r91_{11}$ and contact surface $91_{12}$ having radius $r91_{12}$; in the illustrated example the convex surface $91_{11}$ has a constant radius $r91_{11}$ about axis $A91_{11}$ over width $W91_{11}$. The convex surface $91_{12}$ has a constant radius $r91_{12}$ about axis $A91_{12}$ over width $W91_{12}$, and so on for each contact surface, and in embodiments each radii $r91_{11,12}$ have a constant magnitude along the widths $W91_{11}$, $W91_{12}$ (FIG. 4C) of contact surfaces $91_{11,12}$. In alternative embodiments radius $r91_{11}$ and radius $r91_{12}$ have the same magnitudes as each other, radius $r91_{11}$ and radius $r91_{12}$ have magnitudes that are different from one another, radius $r91_{11}$ and radius $r91_{12}$ have magnitudes that vary about axis $A46_1$, and combinations thereof.

Referring to the example of FIG. 4B, shown is an example of the first yoke 31 in an elevational sectional view and taken along lines 4B-4B of FIG. 4C. As shown, contact surfaces $91_{11,\,21}$ are each on portions of pivots $46_{1,\,2}$ that are upward facing along axis $A_Y$, and contact surfaces $91_{12,22}$ are each on portions of pivots $46_{1,2}$ that are downward facing along axis $A_Y$. For the purposes of illustration, in the embodiment of FIG. 4B, axes $A85_{1,2}$ of the bores $85_{1,\,2}$ of the first yoke 31 are substantially parallel with axis $A_X$ and substantially coaxial with one another. In this example, the radii $r91_{11,\,12,\,21,\,22}$ ("$r91_{11\text{-}22}$") of each of the contact surfaces $91_{11\text{-}22}$ have magnitudes that remain substantially constant along the widths $W91_{11\text{-}22}$ of the contact surfaces $91_{11\text{-}22}$; and with respect to their corresponding axes (i.e. for $r91_{11}$ along $A91_{11}$, $r91_{12}$ along $A91_{12}$ and so on). Further illustrated are that the axes $A91_{11,\,12,\,21,\,22}$ ("$A91_{11\text{-}22}$") of contact surface $91_{11\text{-}22}$ are oblique to axes $A85_{1,2}$ in the X-Y plane; and in the examples shown axes $A85_{11\text{-}22}$ are offset from axes $A85_{1,2}$ by an angle θ. Example values of angle θ range from about 0.5° to about 3°, and in specific examples angle θ is any value between. In the embodiments shown, axis $A91_{11}$ and axis $A91_{22}$ are substantially parallel with one another, and axis $A91_{12}$ and axis $A91_{21}$ are also parallel with one another, and axes $A91_{11,22}$ are oblique to axes $A91_{12,21}$.

Figure 5A:
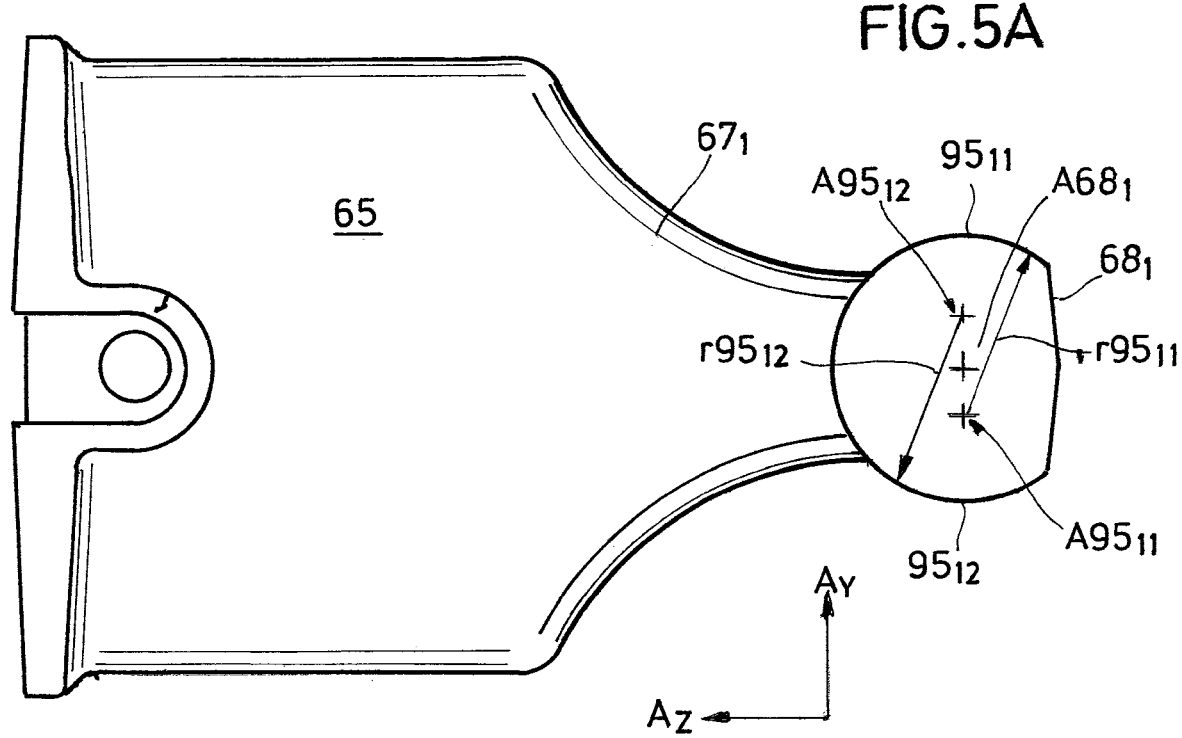
Figure 5B:
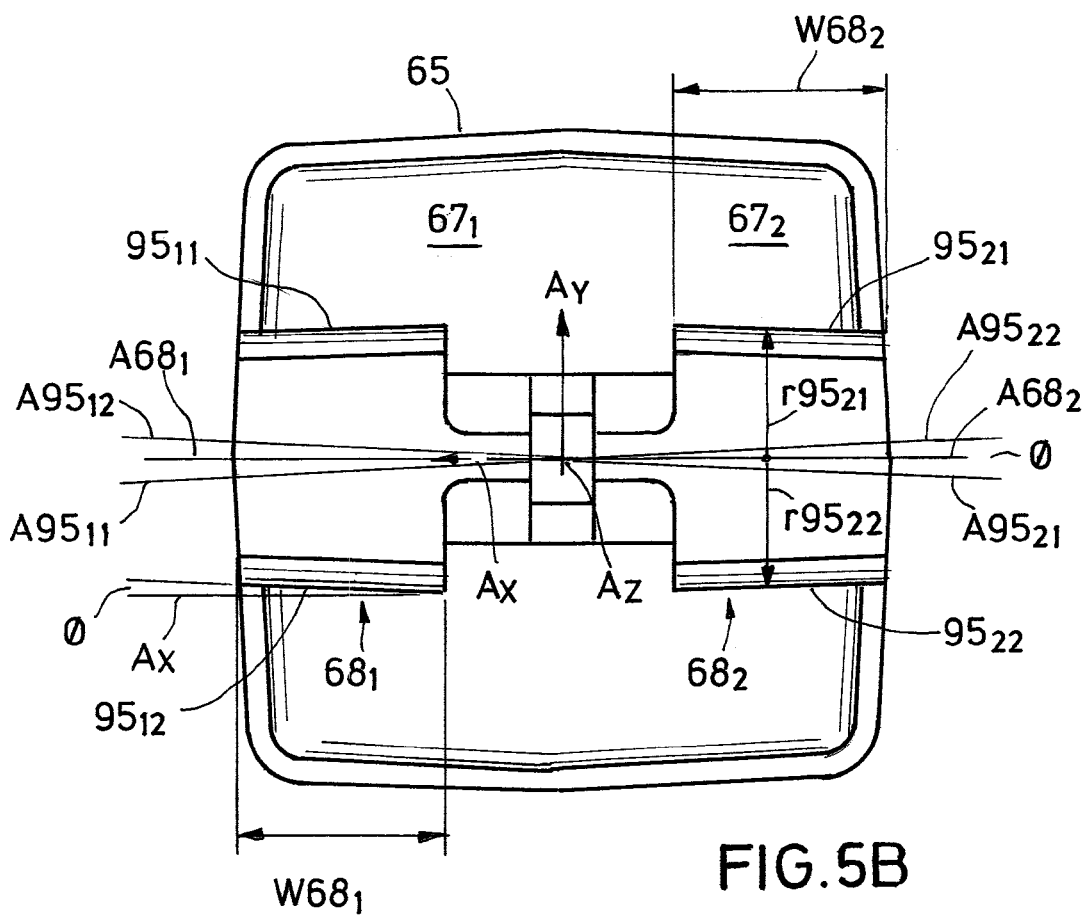

Referring now to FIGS. 5A-5C, shown are side, elevational, and perspective views of an example of the second yoke 33. Similar to the contact surfaces $91_{11\text{-}22}$ of FIGS. 4A-4C, second yoke contact surfaces $95_{11,\,12,\,21,\,22}$, ("$95_{11\text{-}22}$") are shown formed on upper and lower outer surfaces of each of the pivots $68_{1,2}$. In the example shown, contact surfaces $95_{11\text{-}22}$ have widths $W95_{11,\,12,\,21,\,22}$, ("$W95_{11\text{-}22}$") whose magnitudes that are each substantially the same as magnitudes of widths $W68_{1,\,2}$ of the pivots $68_{1,\,2}$; in alternatives magnitudes of widths $W95_{11\text{-}22}$ are different from magnitudes of widths $W68_{1,\,2}$, and in a further alternative magnitudes of widths $W95_{11\text{-}22}$ are different from one another. As shown in the examples of FIGS. 5A and 5C, lengthwise and along axis $A_Z$ the contact surfaces $95_{11\text{-}22}$ follow a generally curved path. Provided in FIG. 5C are examples of arc lengths $AL95_{11,\,21}$ of contact surfaces $95_{11}$, $95_{21}$. Shown in the example of FIG. 5A contact surface $95_{11}$ has radius $r95_{11}$ and contact surface $95_{12}$ having radius $r95_{12}$; in the illustrated example radius $r95_{11}$ and radius $r95_{12}$ each have the same magnitude at all angular positions respectively about axes $A95_{11}$ and $A95_{12}$, and in embodiments each radii $r95_{,12}$ have a constant magnitude along the widths $W95_{11}$, $W95_{12}$ (FIG. 5C) of contact surfaces $95_{11,\,12}$. In alternative embodiments radius $r95_{11}$ and radius $r95_{12}$ have the same magnitudes as each other, radius $r95_{11}$ and radius $r95_{12}$ have magnitudes that are different from one another, radius $r95_{11}$ and radius $r95_{12}$ have magnitudes that vary about axis $A68_1$, and combinations thereof.

Referring to the example of FIG. 5B, shown is an example of the second yoke 33 in an elevational sectional view and taken along lines 5B-5B of FIG. 5C. As shown, contact surfaces $95_{11,\,21}$ are each on portions of pivots $68_{1,\,2}$ that are upward facing along axis $A_Y$, and contact surfaces $95_{12,22}$ are each on portions of pivots $68_{1,2}$ that are downward facing along axis $A_Y$. For the purposes of illustration, in the embodiment of FIG. 5B, axes $A68_{1,2}$ of pivots $68_{1,\,2}$ of the first yoke 31 are substantially parallel with axis $A_X$ and substantially coaxial with one another. In this example, the radii $r95_{11,\,12,\,21,\,22}$ ("$r95_{11\text{-}22}$") of each of the contact surfaces $95_{11\text{-}22}$ have magnitudes that remain substantially constant along the widths $W95_{11\text{-}22}$ of the contact surfaces $95_{11\text{-}22}$. Further illustrated are that the axes $A95_{11,\,12,\,21,\,22}$ ("$A95_{11\text{-}22}$") of contact surface $91_{11\text{-}22}$ are oblique to axes $A68_{1,2}$ in the X-Y plane; and in the examples shown axes $A95_{11\text{-}22}$ are offset from axes $A68_{1,2}$ by an angle Φ. Example values of angle Φ range from about 0° to about 3°, and in specific examples angle Φ is any value between. Optionally, magnitudes of angle θ and angle Φ are substantially the same. In the embodiments shown, axis $A95_{11}$ and axis $A95_{22}$ are substantially parallel with one another, and axis $A95_{12}$ and axis $A95_{21}$ are also parallel with one another, and axes $A95_{11,22}$ are oblique to axes $A95_{12,21}$.

Figure 6A:
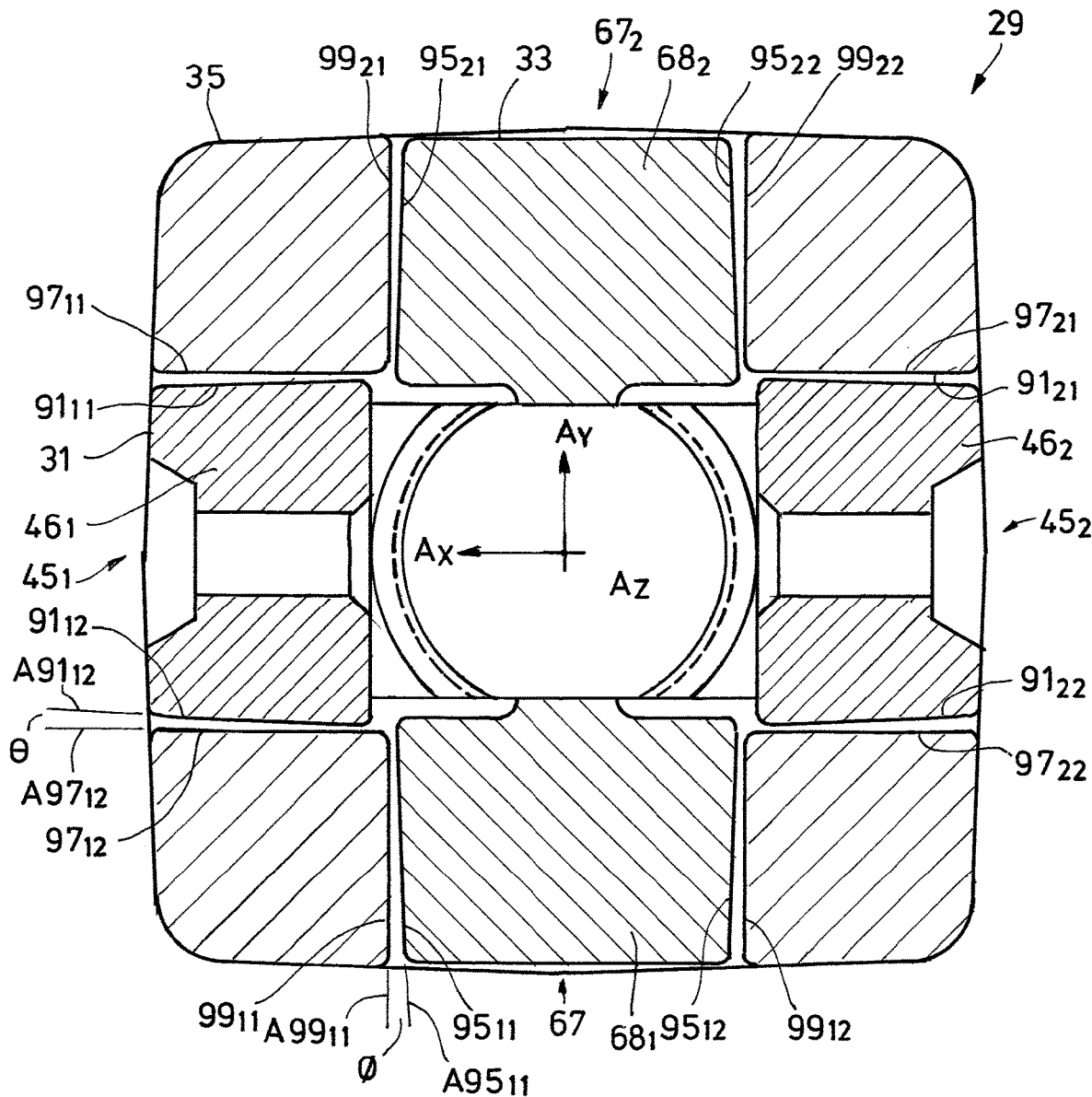
FIG. 6A is sectional view of the coupling assembly of FIG. 2 taken along lines 6A-6A in a non-rotating example of operation.
Figure 6B:
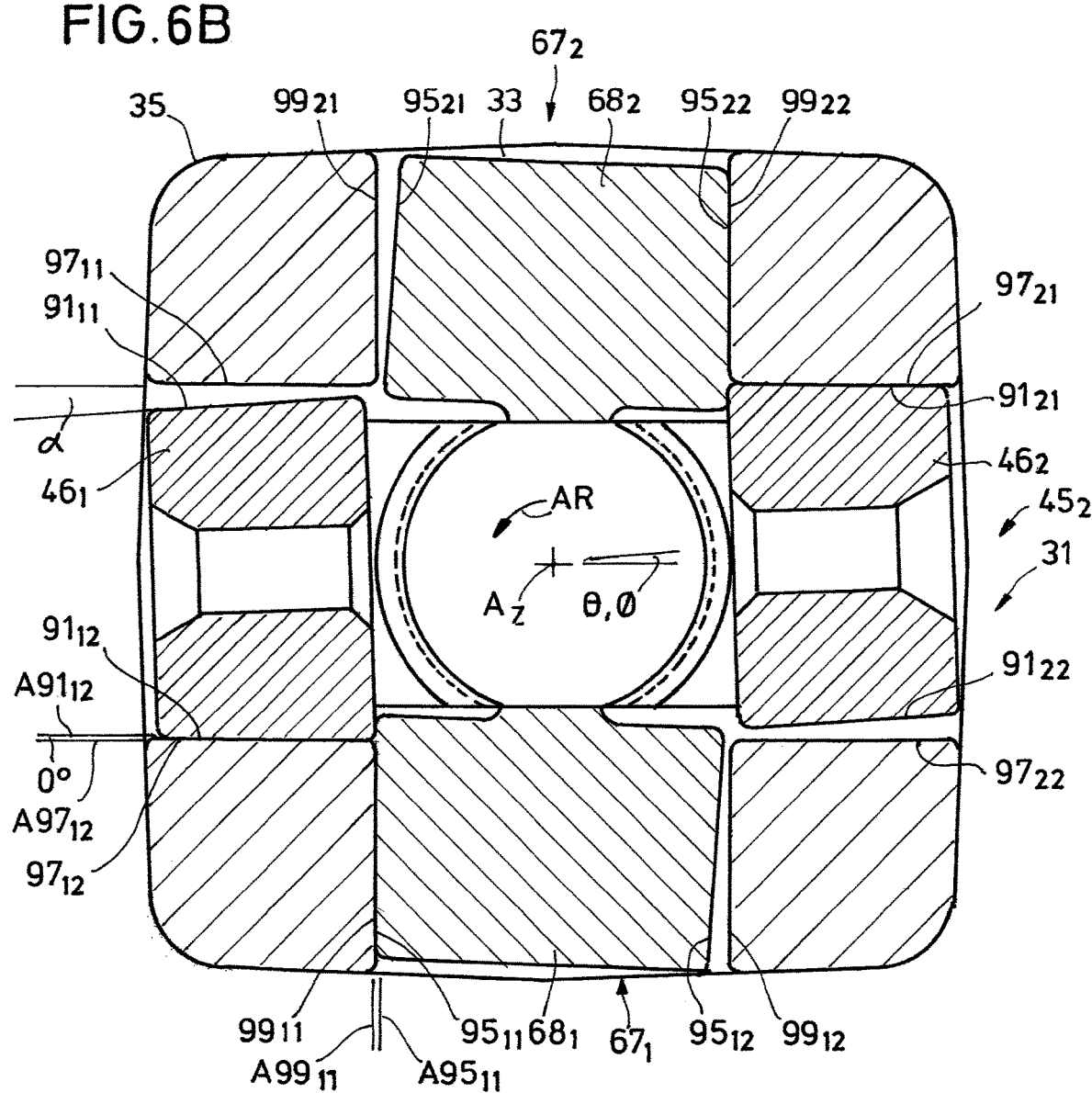
FIG. 6B is sectional view of the coupling assembly of FIG. 2 taken along lines 6B-6B in a rotating example of operation.

Referring now to FIGS. 6A and 6B, shown is an axial sectional view of the coupling assembly 29 taken along lines 6A/B-6A/B of FIG. 2. In the example of FIG. 6A no torque is being applied to or across the assembly 29 and its components are not rotating, which for the purposes of discussion herein is what is referred to as a static configuration or static state. Also in this example the first yoke 31 is in what is referred to as a first position. Depicted in FIG. 6 is that connector first contact surfaces $97_{11,\,12,\,21,\,22}$ ("$97_{11\text{-}22}$") on connector 35 are shown facing and spaced away from corresponding first yoke contact surfaces $91_{11\text{-}22}$ on arms $45_{1,2}$ and connector second contact surfaces $99_{11,\,12,\,21,\,22}$ ("$99_{11\text{-}22}$") are shown facing and spaced away from corresponding contact surfaces $95_{11\text{-}22}$ on arms $67_{1,2}$. A corresponding contact surface refers to contact surfaces that are brought into contact with one another. Referring back to FIG. 3, illustrated are examples of contact surfaces $99_{12,22}$ formed on sidewalls $77_1$ of connector 35 and adjacent end wall 83. Also shown on FIG. 3 is that contact surfaces $97_{11}$, $99_{12}$ each have widths $W97_{11}$, $W99_{12}$ and arc lengths $AL97_{11}$, $AL99_{12}$; where the arc lengths $AL97_{11}$, $AL99_{12}$ are curved along axis $A_Z$. In alternatives, all contact surfaces $97_{11\text{-}22}$, $99_{11\text{-}22}$ on connector 35 have arc lengths that are curved. In a further alternative, contact surfaces $97_{11\text{-}22}$ each have a radius of substantially the same magnitude as a radius of each of corresponding contact surfaces $91_{11\text{-}22}$, and contact surfaces $99_{11\text{-}22}$ each have a radius of substantially the same magnitude as a radius of each of corresponding contact surfaces $95_{11\text{-}22}$. Referring back to FIG. 6A, the contact surfaces $97_{11\text{-}22}$, are shown extending laterally along a line substantially parallel with axis $A_X$ and oblique with opposing contact surfaces $91_{11\text{-}22}$. In examples in which each contact surface $97_{11\text{-}22}$ has a generally circular cross section and a radius that is substantially constant along its width, the axis $A91_{11}$ of contact surface $91_{11}$ is oblique with axis $A97_{11}$ of contact surface $97_{11}$. Further shown in FIG. 6A is that axes $A91_{12}$, $A97_{12}$ are offset from one another by an amount substantially equal to angle θ. For the purposes of clarity axes $A91_{12,21,22}$, $A97_{12,\ 21,\ 22}$ are not shown, but in examples these axes are oblique to one another similar to axis $A91_{12}$ and axis $A97_{12}$.

Referring now to FIG. 6B, shown is a non-limiting example of operation in which the first yoke 31 is rotated about axis $A_Z$ so that contact surfaces $91_{12,\ 21}$ interface with contact surfaces $97_{12,\ 21}$ and contact surfaces $95_{11,\ 21}$ engage contact surfaces $99_{11,\ 21}$. In an alternative, operation is initiated by delivering torque to the drive shaft 23 of (FIG. 1), which rotates first yoke 31 to a second position (not shown). In the second position pivots $46_{1,2}$ are rotated about axis $A_Z$ by angle θ, which moves first yoke contact surfaces $91_{12}$ and $91_{21}$ into engaging contact with connector first contact surfaces $97_{12}$ and $97_{21}$. When contact surfaces $91_{12}$, $97_{12}$ are engaged as shown, their respective axes $A91_{12}$, $A97_{12}$ are substantially parallel so that contact interface between contact surfaces $91_{12}$, $97_{12}$ extends substantially along the widths of one or more of contact surfaces $91_{12}$, $97_{12}$. In examples when the radii of contact surfaces $91_{12}$, $97_{12}$ are substantially the same, the contact interface between contact surfaces $91_{12}$, $97_{12}$ extends substantially along the entire arc length of one or more of contact surfaces $91_{12}$, $97_{12}$. To recap, contact surface $91_{12}$ is offset from or misaligned with its corresponding contact surface $97_{12}$ when the coupling assembly 29 is in the static configuration of FIG. 6A. Contact surface $91_{12}$ is shaped or profiled so that when engaged with the corresponding contact surface $97_{12}$ a contact interface extends substantially along one or more widths and/or arc lengths of each opposing/corresponding contact surface. An advantage of this shaping or profiling increases a contact interface area formed when the corresponding contact surfaces are in engaging contact, which distributes load transfers across the larger area to avoid force and stress concentrations. Otherwise, contact interface between opposing or corresponding contact surfaces would be limited to a smaller portion of the length of these surfaces. A further advantage is that by forming a coupling assembly where opposing/corresponding contact surfaces are spaced away from one another when in a static configuration allows the components to be assembled manually and without power assistance, such as from a hydraulic tool.

As shown in the example of FIG. 6B, further rotation of the first yoke 31 in the same direction rotates the connector 35 so that the connector second contact surfaces $99_{11}$ and $99_{22}$ come into engaging contact with the second yoke contact surfaces $95_{11,\ 22}$ on the pivots $68_{12}$ of the second yoke 33. In FIG. 6B, the first yoke 31 is in a third position. In an example, when moving from the first position to the second position the first yoke 31 (and connector 35) rotates from about 0.5° to about 3°, in specific examples the rotation is about 1.2°. In an example, when moving from the second position to the third position, the first yoke 31 (and connector 35) rotates from about 0.5° to about 3°, in specific examples the rotation is about 1.2°. Similar to the angular offset of axes $A91_{12}$, $A97_{12}$ shown in FIG. 6A, axes $A95_{11}$, $99_{11}$ are offset by an angle Φ when in the static configuration and are substantially parallel when the contact surfaces $95_{11}$, $99_{11}$ are brought into engaging contact. Also shown in FIG. 6B are that contact surfaces $91_{21}$, $97_{21}$ and contact surfaces $95_{22}$, $99_{22}$ are in engaging contact, and which had been offset by angle θ or Φ when in the static configuration. In an alternative, angles θ and Φ have substantially the same angular magnitudes. Similarly, the advantages discussed above with regard to the shaping or profiling of contact surface $91_{12}$ extend to shaping or profiling of the remaining contact surfaces. Optionally, the rotation discussed above is applied in a reverse direction so that contact surface $91_{11}$ is in selective contact with contact surface $97_{11}$ and the profiled contact surface $91_{11}$ aligns with contact surface $97_{11}$ when engaged. In this example second yoke 33 operates as a drive yoke and first yoke 31 as a driven yoke, whereas when torque is transferred from first yoke 31 to second yoke 33, first yoke 31 operates as a drive yoke and second yoke 33 as a driven yoke. In alternatives, contact surfaces $97_{11\text{-}22}$ and/or $99_{11\text{-}22}$ are profiled in a way similar to contact surfaces $91_{11\text{-}22}$ and/or $95_{11\text{-}22}$. In an alternative, axes $A97_{11\text{-}22}$ and $A99_{11\text{-}22}$ are oblique with respect to axes $A_Y$, $A_X$, and axes $A46_{1,2}$, $A68_{1,2}$ are parallel to axes $A91_{11\text{-}22}$ and $A95_{11\text{-}22}$. Similar to the embodiment of FIGS. 6A and 6B, rotating first yoke 31 puts the contact surfaces on the first and second yokes 31, 33 into contact with contact surfaces on connector 35 and along their respective lengths. In another alternative, axes $A46_{1,2}$, $A68_{1,2}$ and axes $A97_{11\text{-}22}$, $A99_{11\text{-}22}$ are parallel respectively to axes $A91_{11\text{-}22}$, $A95_{11\text{-}22}$ to and axes $A_Y$, $A_X$, and compressive forces applied over time wear the contacting surfaces into profiles so that the force distribution is substantially uniform along the contact surface areas.

Figure 7:
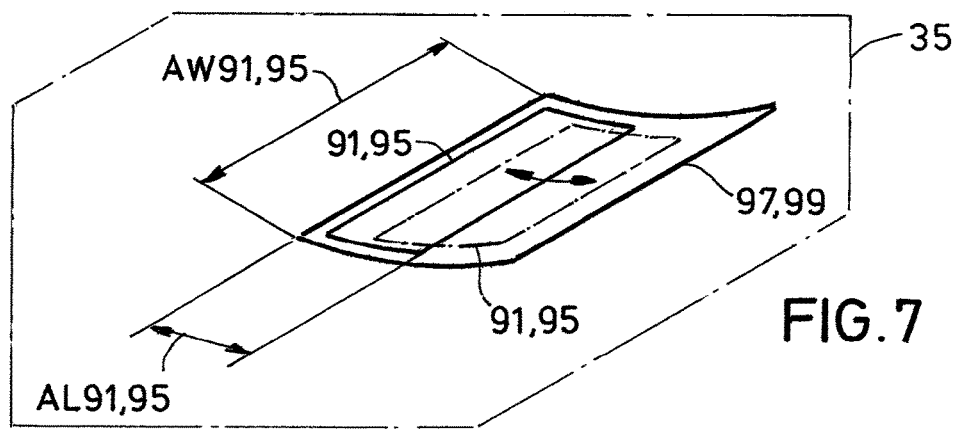
FIG. 7 is a schematic example of contact surfaces on the drive and driven yokes in engagement with the contact surfaces on connector.

Illustrated in FIG. 7 is an example of engagement between the contact surfaces 91, 95 on the first and second yokes 31, 33 and with the contact surfaces 97, 99 on connector 35. In this example and for the purposes of simplicity, contact surfaces 91, 95, 97, 99 represent surfaces $91_{11\text{-}22}$, $95_{11\text{-}22}$, $97_{11\text{-}22}$, $99_{11\text{-}22}$ respectively. For the purposes of discussion herein, complementary contact refers to contact of a contact surface where the interface of contact extends substantially along the width and length of the particular contact surface. As shown in FIG. 7 contact surfaces 91, 95 are in contact with contact surfaces 97, 99 substantially along their entire widths $AW_{91,\ 95}$ and lengths $AL_{91,\ 95}$ and so that contact surfaces 91, 95 are shown in complementary contact. Similar to contact surfaces discussed above, contact surfaces 91, 95 of FIG. 7 are curved along their lengths. Further illustrated in FIG. 7 is an example of the area of contact surfaces 97, 99 being greater than the area of contact surfaces 91, 95 so that during operation, the surfaces 91, 95 are slidable along the surfaces 97, 99 and remain in complementary contact with surfaces 97, 99 when in sliding contact. In an example, the sliding of contact surfaces 91, 95 is generated as either the first or second yokes 31, 33 pivot with respect to connector 35. Contact surfaces 97, 99 in FIG. 7 are not in complementary contact as contact surfaces 91, 95 cover less than substantially all of their surface area.

In a non-limiting example of operation, first yoke 31 is coupled with connector 35 by sliding arms $45_{12}$ into the first slot 47 of connector 35, and then second yoke 33 is coupled with connector 35 by sliding arms $67_{12}$ into the second slot 69. Pin 63 is then inserted into bores $85_{12}$ and into slot 87 to couple the primary components of the coupling assembly 29. A drive shaft 23 is engaged with the first yoke collar 39 and a driven shaft $23_{n\text{-}1}$ coupled with an end of the second yoke 33 distal from first yoke 31. As noted above, the first and second yokes 31, 33 are combined with connector 35 and the pin 62 is inserted to form the assembly 29 manually and without the need for power or hydraulic tools. Drive shaft $23_n$ is rotated in a direction illustrated by arrow $A_R$ about axis $A23_n$ to cause an angular rotation of the first yoke 31 and move the first yoke 31 from its first position to the second position to contact first yoke 31 with connector 35. In the second position contact surfaces $91_{12,\ 21}$ respectively come into contact with the connector first contact surfaces $97_{12, 21}$ and rotate connector 35 in the direction of $A_R$. Continued rotation imparted by drive shaft $23_n$ moves first yoke 31 into the third position that in turn rotates the connector 35 so that its connector second contact surfaces $99_{11}$, $99_{22}$ come into complementary contact with second yoke contact surfaces, $95_{11, 22}$ to thereby result in angular rotation of the second yoke 33 and the connected driven shaft $23_{n-1}$. An advantage of the complementary contact between these contact surfaces is that the forces are distributed in these contacts surfaces along a much greater surface area which lessons force concentrations unlike needle bearings and other components in similar flexible couplings. The increased force distribution lowers a concentration density and increases the life and reliability of the components in the assembly 29. Referring back to FIG. 1, in this example transferring torque or rotational force to assembly 29 from drive shaft $23_n$ adjusts orientation of the solar panels 15 installed in the solar assembly 11. Use of coupling assembly 29 is not limited to use in solar application, and in alternatives are installed in any type of drive shaft in which torque is transmitted from one rotating member to an adjacent rotating member coupled with the coupling assembly 29; examples of alternative use include those in manufacturing, processing, actuation of the opening and closing of different devices, transportation and any other situation that involves torque transmission through a drive train.

Figure 8A:
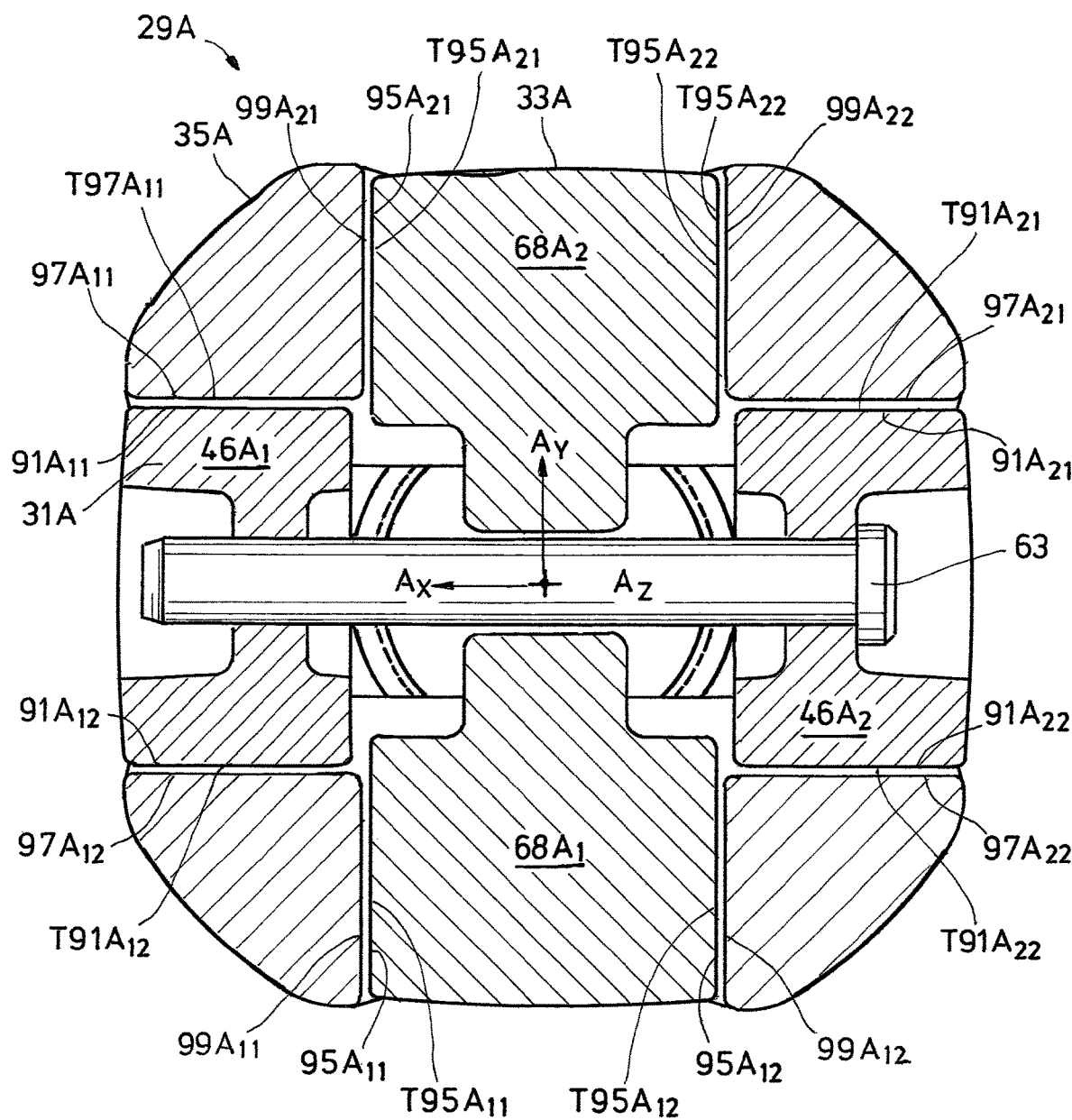
FIG. 8A is sectional view of an alternate example of the coupling assembly of FIG. 2 taken along lines 8A-8A in a non-rotating example of operation.
Figure 8B:
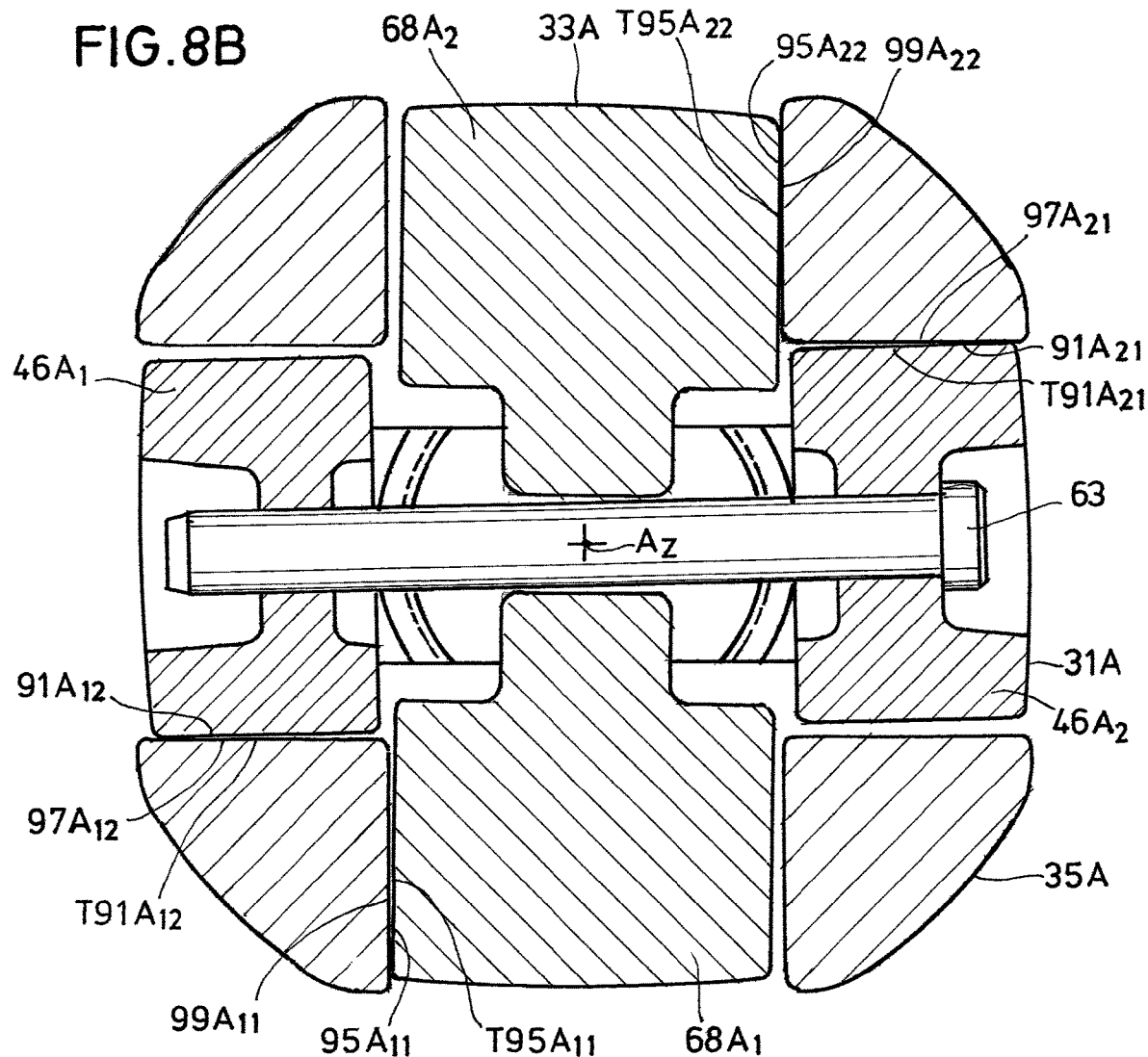
FIG. 8B is sectional view of an alternate example of the coupling assembly of FIG. 2 taken along lines 8B-8B in a rotating example of operation.
Figure 8C:
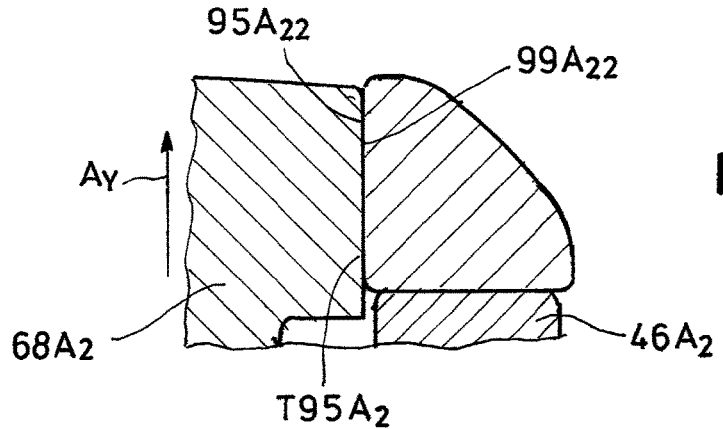
FIG. 8C is a portion of FIG. 8B and enlarged for detail.

Schematically illustrated in FIGS. 8A-8C is an alternate example of the coupling assembly 29A in which transitions $T91A_{11-22}$, $T95A_{11-22}$ are provided respectively on contact surfaces $91A_{11-22}$ and $95A_{11-22}$. Transitions $T91A_{11-22}$, $T95A_{11-22}$ represent a location on contact surfaces $91A_{11-22}$ and $95A_{11-22}$ where they undergo a change in profile. Referring specifically to FIG. 8A shown is a portion of contact surface $91A_{12}$ that is radially outward of transition $T91A_{12}$ along axis $A_X$, and which has an axis of curvature that is generally parallel with axis $A_X$. Further in this example the portion of contact surface $91A_{12}$ radially inward of transition $T91A_{12}$ and along axis $A_X$ has an axis of curvature that is oblique to axis $A_X$; and in alternatives has an axis of curvature generally parallel with that of contact surface $97A_{12}$. Similar differences in profiles are created along surfaces $91A_{11, 21, 22}$ by transitions $T91A_{11, 21, 22}$, and along axis $A_Y$ on surfaces $95A_{11-22}$ by transitions $T95A_{11-22}$.

Referring now to FIG. 8B, shown is that first yoke 31A has been rotated in a counterclockwise direction about axis $A_Z$ so that surfaces $91A_{11, 21}$ touch surfaces $97A_{11, 21}$ on connector 35A; and further rotation of first yoke 31A in the counterclockwise direction rotates connector 35A putting surfaces $95A_{11, 21}$ and surfaces $99A_{11, 21}$ on second yoke 33A into contact with one another. In this example, due to the transitions $T91A_{11-22}$, $T95A_{11-22}$ complementary contact does not occur between surfaces $91A_{11, 21}$ and $97A_{11, 21}$ and surfaces $95A_{11,21}$ and $99A_{11,21}$ radially inward from transitions $T91A_{11-22}$, $T95A_{11-22}$. An example of the reduced complementary contact is shown in an enlarged detail view in FIG. 8C in which separation between the surfaces $95A_{22}$, $99A_{22}$ is shown radially inward from transition $T95A_{22}$ along axis $A_Y$. In a non-limiting example of operation, portions of contact surfaces $91A_{11-22}$ and $95A_{11-22}$ separated by transitions $T91A_{11-22}$, $T95A_{11-22}$ undergo wear, such as from mechanical stresses exerted onto contact surfaces $91A_{11-22}$ and $95A_{11-22}$, such that the profiles of the contact surfaces $91A_{11-22}$ and $95A_{11-22}$ on both sides of the transitions $T91A_{11-22}$, $T95A_{11-22}$ become substantially similar so that over time surfaces $91A_{11, 21}$ and $97A_{11, 21}$ and surfaces $95A_{11, 21}$ and $99A_{11, 21}$ are in complementary contact on both sides of transitions $T91A_{11-22}$, $T95A_{11-22}$.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of operating a drive train comprising:
   obtaining a connector comprising a main body having a first slot, a second slot, and a socket formed in the first slot;
   obtaining a first yoke comprising a first yoke arm, a pivot on an end of the first yoke arm, and a bore projecting through the pivot;
   obtaining a second yoke comprising an upper arm, a lower arm spaced axially from the upper arm, and a slot extending longitudinally between the upper and lower arms;
   inserting the first yoke arm into the first slot so that the pivot is within the socket;
   inserting the upper and lower arms into the second slot;
   inserting a pin into the bore and into the slot that extends between the upper and lower arm to interfere with lateral movement of the second yoke with respect to the first yoke and to the connector, and
   rotating the second yoke by rotating the first yoke.

2. The method of claim 1, wherein the pivot comprises a male convex profile having a first contact surface and the socket comprises a female concave profile having a second contact surface, and wherein the first and second contact surfaces are brought into complementary contact with one another by rotating the first yoke, so that an interface of contact between the first and second contact surfaces extends substantially along the width and length of at least one of the first or second contact surfaces.

3. The method of claim 2, wherein the convex profile is cylindrically shaped about a first axis, and the female concave profile is cylindrically shaped about a second axis, wherein the first and second axes are oblique to one another when the first and second contact surfaces are spaced apart from one another, and wherein the first and second axes are parallel with one another when the first and second contact surfaces are in complementary contact with one another.

4. The method of claim 3, wherein a second yoke contact surface is defined on a portion of the second yoke arm and a connector second contact surface is defined on a portion of the connector, wherein the second yoke contact surface is oblique to the connector second contact surface when the second yoke arm is inserted into the second slot and out of contact with the second slot sidewalls, and the second yoke contact surface is substantially in complementary contact with the connector second contact surface when the first yoke is rotated from the second position to a third position.

5. The method of claim 1, wherein rotating the second yoke adjusts a solar panel that is coupled with the second yoke.

6. The method of claim 1, wherein the first yoke arm comprises a left yoke arm and a right yoke arm.

7. The method of claim 1, wherein the second slot comprises sidewalls on opposing sides of the second slot that are profiled to define a socket within the second slot, the socket having an axis that extends in a direction perpendicular to a side of the connector, and wherein another pivot is on a free end of the second yoke arm and that inserts into the socket and is pivotable about the socket axis.

8. The method of claim 1, wherein the first yoke arm is configured to be manually inserted into the first slot of the connector and the second yoke arm is configured to be manually inserted into second slot of the connector.

9. A coupling assembly for use with a drive train comprising:
a connector comprising a main body, a first slot formed in the main body and having a portion that defines a socket, a connector first contact surface in the first slot, a second slot on a side of the connector main body facing away from the first slot, and a connector second contact surface on the second slot sidewalls, the first contact surface being concave and having a constant radius about a first axis;
a first yoke having a first yoke arm configured to be manually insertable into the first slot and a pivot on an end of the first yoke arm that is in the socket when the first yoke arm is inserted into the first slot, the first yoke rotatable from a first position in which the pivot is spaced away from the socket to a second position in which the pivot is in contact with the socket;
a pivot contact surface formed on an outer surface of the pivot, the pivot contact surface being convex and having a constant radius along a second axis, the first contact surface and pivot contact surface profiled so that when the first yoke is in the first position the first axis is oblique to the second axis, and when first yoke is rotated into the second position the first axis is parallel with the second axis to form an interface between the pivot contact surface and first contact surface that extends substantially along a width of the pivot contact surface; and
a second yoke having a second yoke arm configured to be manually insertable into the second slot, so that when the first yoke is rotated, torque is transferred through the connector to rotate the second yoke.

10. The coupling assembly of claim 9, the first yoke comprising,
an end selectively coupled with a drive shaft.

11. The coupling assembly of claim 9, wherein an arc length of the first yoke contact surface follows a generally circular path.

12. The coupling assembly of claim 11, wherein the first and second slots extend generally transverse to one another through a main body of the connector, and wherein a fastener couples the first and second yokes.

13. The coupling assembly of claim 9, wherein the first yoke is further rotatable to a third position that rotates the connector in the same angular direction as the first yoke.

14. The coupling assembly of claim 13, wherein rotating the first yoke from about 0.5° to about 3° in a first direction moves the first yoke from the first to the second position, and wherein further rotating the first yoke from about 0.5° to about 3° in the first direction moves the first yoke from the second to the third position.

15. The coupling assembly of claim 14 the second yoke arm comprising,
a second yoke contact surface having a portion that is oblique to a connector second contact surface on the driven slot sidewalls when the second yoke arm is inserted into the second slot and out of contact with the second slot sidewalls and when the first yoke is in the first position, and wherein when the first yoke is rotated into the third position the portion of the second yoke contact surface is in complementary contact with the connector second contact surface.

16. The coupling assembly of claim 9, wherein a width of the first yoke contact surface spans along and is oblique to a horizontal axis of the first yoke, and wherein a length of the first yoke contact surface is curved and spans along a lengthwise axis of the first yoke.

17. The coupling assembly of claim 9, further comprising another first yoke arm, another second yoke arm, another connector first contact surface, and another connector second contact surface, wherein contact surfaces are on the first yoke arm and the another first yoke arm that face away from one another, and wherein contact surfaces are on the second yoke arm and the another second yoke arm that face away from one another.

18. The coupling assembly of claim 17, wherein when the first yoke is rotated to a second position portions of the first yoke arm and the another yoke arm are in complementary contact with portions of connector first contact surfaces, and wherein when the first yoke is rotated to a third position, connector second contact surfaces have portions that are in complementary contact with contact surfaces on the second yoke arm and the another second yoke arm.

19. A coupling assembly for use with a drive train comprising:
a first yoke having a first yoke arm and a bore formed through the first yoke arm;
a second yoke having a pair of second yoke arms and a second yoke slot formed longitudinally between the second yoke arms;
a connector having a body with slots formed on opposing sides of the body that respectively receive the first yoke arm and the pair of second yoke arms; and
a pin that selectively inserts into the bore and to within the second yoke slot and in a path of lateral movement of the second yoke.

20. The coupling assembly of claim 19, wherein the connector defines a means for transferring rotation between the first yoke and second yoke.

* * * * *